US006400310B1

(12) United States Patent
Byrnes et al.

(10) Patent No.: US 6,400,310 B1
(45) Date of Patent: Jun. 4, 2002

(54) METHOD AND APPARATUS FOR A TUNABLE HIGH-RESOLUTION SPECTRAL ESTIMATOR

(75) Inventors: Christopher I. Byrnes, St. Louis, MO (US); Anders Lindquist, Täby (SE); Tryphon T. Georgiou, Falcon Heights, MN (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 09/176,984

(22) Filed: Oct. 22, 1998

(51) Int. Cl.[7] .......................... G10L 11/00; G01S 13/58
(52) U.S. Cl. ........................ 342/115; 342/45.3; 342/84; 342/104; 704/270
(58) Field of Search ................................ 704/500, 270; 367/43, 67, 7, 90; 342/453, 84, 104–117

(56) References Cited

U.S. PATENT DOCUMENTS 4,209,836 A 6/1980 Wiggins, Jr. et al. ....... 364/718
4,385,393 A 5/1983 Chaure et al. ................ 375/30
4,941,178 A 7/1990 Chuang ....................... 381/41
5,023,910 A 6/1991 Thomson ..................... 381/37
5,048,088 A 9/1991 Taguchi ....................... 381/38
5,053,983 A * 10/1991 Hyatt .................... 364/724.03
5,179,626 A 1/1993 Thomson ....................... 395/2
5,327,521 A 7/1994 Savic et al. ................. 704/272
5,396,253 A 3/1995 Chia .......................... 342/104
5,432,822 A 7/1995 Kaewell, Jr. ................ 375/340
5,774,835 A 6/1998 Ozawa ....................... 704/205
5,774,839 A 6/1998 Shlomot ..................... 704/222
5,930,753 A 7/1999 Potamianos et al. ........ 704/256
5,943,429 A 8/1999 Handel ...................... 381/94.2
6,034,922 A * 3/2000 Uhlendorf et al. ............. 367/7

OTHER PUBLICATIONS

D. Quarmby, *Signal Processing Chips,* Prentice Hall, 1994, pp. 27–29.
L.R. Rabiner, B.S. Atal, and J.L. Flanagan, Current Methods Of Digital Speech Processing, Selected Topics in Signal Processing (S.Haykin, editor), Prentice Hall, 1989, pp. 112–132.
C.G. Bell, H. Fujisaki, J.M. Heinz, K.N. Stevens, and A.S. House, Reduction of Speech Spectra by Analysis–by–Synthesis Techniques, J. Acoust. Soc. Am. 33 (1961) 1725–1736, p. 1726.
J.D. Markel and A.H. Gray, Jr., *Linear Prediction of Speech,* Springer–Verlag, Berlin, 1976, pp. 271–272.
L.R. Rabiner and R.W. Schafer, *Digital Processing Of Speech Signals,* Prentice Hall, Englewood Cliffs, N.J., 1978, pp. 76–78, 105.

(List continued on next page.)

*Primary Examiner*—William Korzuch
*Assistant Examiner*—Susan McFadden
(74) *Attorney, Agent, or Firm*—Thompson Coburn LLP; R. Haferkamp

(57) ABSTRACT

A high resolution spectral estimator (HREE) filter coupled to a spectral plotter processes either Doppler frequencies provided from the output of a pulse-Doppler radar or a frequency based output provided by a Fourier transformer coupled to a sensing device to allow the spectral plotter to determine the power frequency spectrum of either the pulse-Doppler radar output or sensing device output. The HREE filter preferably comprises a bank of first order filters tuned to a pre-selected frequency, a covariance estimator coupled to the filter bank for estimating filter covariances, and a decoder coupled to the covariance estimator for producing a plurality of filter parameters. Further, it is preferable that the filters comprising the filter bank be adjustable to permit their being tuned to a desired frequency based on a priori information.

44 Claims, 10 Drawing Sheets

OTHER PUBLICATIONS

L.O. Chua, C.A. Desoer, and E.S. Kuh, *Linear and Nonlinear Circuits,* McGraw–Hill, 1989, pp. 658–659.

P. Stoica and R.L. Moses, *Introduction to Spectral Analysis,* Prentice Hall, 1997, pp. 27–29, 33, 136, 139, 175, 248.

B. Porat, *Digital Processing Of Random Signals,* Prentice Hall, 1994, pp. 156–162, 285–286, 402–403.

M.A. Hasan, M.R. Azimi–Sadjadi, and G.J. Dobeck, Separation of Multiple Time Delays Using New Spectral Estimation Schemes, IEEE Transactions On Signal Processing 46 (1998), 1580–1590.

M. Zeytinoglu and K.M. Wong, Detection of Harmonic Sets, IEEE Transactions On Signal Processing 43 (1995), 2618–2630.

J.P. Campbell, Jr., Speaker Recognition: A Tutorial, Proceedings of the IEEE 85 (1997), pp. 1437–1462.

J.M. Naik, Speaker Verification: A Tutorial, IEEE Communications Magazine (1990), pp. 42–48.

H. Sakoe and S. Chiba, Dynamic Programming Algorithm Optimization for Spoken Word Recognition, IEEE Transactions on Acoustics, Speech and Signal Processing ASSP–26 (1978), pp. 43–49.

K.J. Aström, Evaluation of Quadratic Loss Functions for Linear Systems, in *Fundamentals Of Discrete–Time Systems: A Tribute to Professor Eliahu I. Jury,* M. Jamshidi, M. Mansour, and B.D.O. Anderson (editors), IITSI Press, Albuquerque, New Mexico, 1993 , pp. 45–56.

M.G. Bellanger, Computational Complexity And Accuracy Issues In Fast Least Squares Algorithms For Adaptive Filtering, Proceedings 1988 IEEE International Symposium on Circuits and Systems, Espoo, Finland, Jun. 7–9, 1988, pp. 2635–2639.

T. Söderström and P. Stoica, *System Identification,* Prentice Hall, New York, 1989, pp. 333–334, 340.

T.P. Barnwell III, K. Nayebi, and C.H. Richardson, *Speech Coding: A Computer Laboratory Textbook,* John Wiley & Sons, Inc., New York, 1996, pp. 9–11, 41–65, 101, 129–132.

C.I. Byrnes, T.T. Georgiou and A. Lindquist, A new approach to spectral estimation: A tunable high–resolution spectral estimator, preprint.

C.I. Byrnes, T.T. Georgiou and A. Lindquist, A generalized entropy criterion for Nevanlinna–Pick interpolation: a convex optimization approach to certain problems in systems and control, preprint.

H. Kwakernaak and R. Sivan, *Modern Signals and Systems,* Prentice Hall, New Jersey, 1991, p. 290.

K.J. Åström, *Introduction To Stochastic Control Theory,* Academic Press, 1970, pp. 117–121.

G. Heinig, P. Jankowski and K. Rost, Fast Inversion Algorithms of Toeplitz–plus–Hankel Matrices, Numerische Mathematik 52 (1988) pp. 665–682.

F.L. Bauer, Ein direktex Iterationsverfahren zur Hurwitz–Zerlegung eines Polynoms, Arch. Elek. Ubertragung, 9 (1955) pp. 285–290.

Z. Vostrý, New Algorithm for Polynomial Spectral Factorization with Quadratic Convergence I, Kybernetika 77 (1975) pp. 411–418.

W.F. Arnold III and A.J. Laub, Generalized Eigenproblem Algorithms and Software for Algebraic Riccati Equations, Proceedings of the IEEE 72 (1984), pp. 1746–1754.

S. Furui, *Recent Advances in Speaker Recognition,* Lecture notes in Computer Science 1206 (1997) pp. 237–252.

L.R. Rabiner and B.H. Juang, An Introduction to Hidden Markov Models, IEEE ASSP Magazine (1986), pp. 4–16.

* cited by examiner

METHOD AND APPARATUS FOR A TUNABLE HIGH-RESOLUTION SPECTRAL ESTIMATOR

BACKGROUND OF THE INVENTION

We disclose a new method and apparatus for encoding and decoding signals and for performing high resolution spectral estimation. Many devices used in communications employ such devices for data compression, data transmission and for the analysis and processing of signals. The basic capabilities of the invention pertain to all areas of signal processing, especially for spectral analysis based on short data records or when increased resolution over desired frequency bands is required. One such filter frequently used in the art is the Linear Predictive Code (LPC) filter. Indeed, the use of LPC filters in devices for digital signal processing (see, e.g., U.S. Pat. Nos. 4,209,836 and 5,048,088 and D. Quarmby, *Signal Processing Chips*, Prentice Hall, 1994, and L. R. Rabiner, B. S. Atal, and J. L. Flanagan, Current methods of digital speech processing, Selected Topics in Signal Processing (S. Haykin, editor), Prentice Hall, 1989, 112–132) is pertinent prior art to the alternative which we shall disclose.

We now describe this available art, the difference between the disclosed invention and this prior art, and the principal advantages of the disclosed invention. FIG. 1 depicts the power spectrum of a sample signal, plotted in logarithmic scale.

We have used standard methods known to those of ordinary skill in the art to develop a 4th order LPC filter from a finite window of this signal. The power spectrum of this LPC filter is depicted in FIG. 2.

One disadvantage of the prior art LPC filter is that its power spectral density cannot match the "valleys," or "notches," in a power spectrum, or in a periodogram. For this reason encoding and decoding devices for signal transmission and processing which utilize LPC filter design result in a synthesized signal which is rather "flat," reflecting the fact that the LPC filter is an "all-pole model." Indeed, in the signal and speech processing literature it is widely appreciated that regeneration of human speech requires the design of filters having zeros, without which the speech will sound flat or artificial; see, e.g., [C. G. Bell, H. Fuisaaki, J. M. Heinz, K. N. Stevons and A. S. House, Reduction of Speech Spectra by Analysis-by-Synthesis Techniques, J. Acoust. Soc. Am. 33 (1961), page 1726], [J. D. Markel and A. H. Gray, *Linear Prediction of Speech*, Springer Verlag, Berlin, 1976, pages 271–272], [L. R. Rabiner and R. W. Schafer, *Digital Processing of Speech Signals*, Prentice-Hall, Englewood Cliffs, N.J., 1978, pages 105, 76–78]. Indeed, while all pole filters can reproduce much of human speech sounds, the acoustic theory teaches that nasals and fricatives require both zeros and poles [J. D. Markel and A. H. Gray, *Linear Prediction of Speech*, Springer Verlag, Berlin, 1976, pages 271–272], [L. R. Rabiner and R. W. Schafer, *Digital Processing of Speech Signals*, Prentice-Hall, Englewood Cliffs, N.J., 1978, page 105]. This is related to the technical fact that the LPC filter only has poles and has no transmission zeros. To say that a filter has a transmission zero at a frequency $\zeta$ is to say that the filter, or corresponding circuit, will absorb damped periodic signals which oscillate at a frequency equal to the phase of $\zeta$ and with a damping factor equal to the modulus of $\zeta$. This is the well-known blocking property of transmission zeros of circuits, see for example [L. O. Chua, C. A. Desoer and E. S. Kuh, *Linear and Nonlinear Circuits*, McGraw-Hill, 1989, page 659]. This is reflected in the fact, illustrated in FIG. 2, that the power spectral density of the estimated LPC filter will not match the power spectrum at "notches," that is, frequencies where the observed signal is at its minimum power. Note that in the same figure the true power spectrum is indicated by a dotted line for comparison.

Another feature of linear predictive coding is that the LPC filter reproduces a random signal with the same statistical parameters (covariance sequence) estimated from the finite window of observed data. For longer windows of data this is an advantage of the LPC filter, but for short data records relatively few of the terms of the covariance sequence can be computed robustly. This is a limiting factor of any filter which is designed to match a window of covariance data. The method and apparatus we disclose here incorporates two features which are improvements over these prior art limitations: The ability to include "notches" in the power spectrum of the filter, and the design of a filter based instead on the more robust sequence of first covariance coefficients obtained by passing the observed signal through a bank of first order filters. The desired notches and the sequence of (first-order) covariance data uniquely determine the filter parameters. We refer to such a filter as a tunable high resolution estimator, or THREE filter, since the desired notches and the natural frequencies of the bank of first order filters are tunable. A choice of the natural frequencies of the bank of filters correspond to the choice of a band of frequencies within which one is most interested in the power spectrum, and can also be automatically tuned. FIG. 3 depicts the power spectrum estimated from a particular choice of 4th order THREE filter for the same data used to generate the LPC estimate depicted in FIG. 2, together with the true power spectrum, depicted in FIG. 1, which is marked with a dotted line.

We expect that this invention will have application as an alternative for the use of LPC filter design in other areas of signal processing and statistical prediction. In particular, many devices used in communications, radar, sonar and geophysical seismology contain a signal processing apparatus which embodies a method for estimating how the total power of a signal, or (stationary) data sequence, is distributed over frequency, given a finite record of the sequence. One common type of apparatus embodies spectral analysis methods which estimate or describe the signal as a sum of harmonics in additive noise [P. Stoica and R. Moses, *Introduction to Spectral Analysis*, Prentice-Hall, 1997, page 139]. Traditional methods for estimating such spectral lines are designed for either white noise or no noise at all and can illustrate the comparative effectiveness of THREE filters with respect to both non-parametric and parametric based spectral estimation methods for the problem of line spectral estimation. FIG. 4 depicts f ve runs of a signal comprised of the superposition of two sinusoids with colored noise, the number of sample points for each being 300. FIG. 5 depicts the five corresponding periodograms computed with state-of-the-art windowing technology. The smooth curve represents the true power spectrum of the colored noise, and the two vertical lines the position of the sinusoids.

FIG. 6 depicts the five corresponding power spectra obtained through LPC filter design, while FIG. 7 depicts the corresponding power spectra obtained through the THREE filter design. FIGS. 8, 9 and 10 show similar plots for power spectra estimated using state-of-the-art periodogram, LPC, and our invention, respectively. It is apparent that the invention disclosed herein is capable of resolving the two sinusoids, clearly delineating their position by the presence of two peaks. We also disclose that, even under ideal noise conditions the periodogram cannot resolve these two frequencies. In fact, the theory of spectral analysis [P. Stoica and R. Moses, *Introduction to Spectral Analysis*, Prentice-Hall, 1997, page 33] teaches that the separation of the sinusoids is smaller than the theoretically possible distance that can be resolved by the periodogram using a 300 point record under ideal noise conditions, conditions which are not satisfied here. This example represents a typical situation in applications.

The broader technology of the estimation of sinusoids in colored noise has been regarded as difficult [B. Porat, *Digital Processing of Random Signals*, Prentice-Hall, 1994, pages 285–286]. The estimation of sinusoids in colored noise using autoregressive moving-average filters, or ARMA models, is desirable in the art. As an ARMA filter, the THREE filter therefore possesses "super-resolution" capabilities [P. Stoica and R. Moses, *Introduction to Spectral Analysis*, Prentice-Hall, 1997, page 136].

We therefore disclose that the THREE filter design leads to a method and apparatus, which can be readily implemented in hardware or hardware/software with ordinary skill in the art of electronics, for spectral estimation of sinusoids in colored noise. This type of problem also includes time delay estimation [M. A. Hasan and M. R. Asimi-Sadjadi, Separation of multiple time delays in using new spectral estimation schemes, IEEE Transactions on Signal Processing 46 (1998), 2618–2630] and detection of harmonic sets [M. Zeytinoğlu and K. M. Wong, Detection of harmonic sets, IEEE Transactions on Signal Processing 43 (1995), 2618–2630], such as in identification of submarines and aerospace vehicles. Indeed, those applications where tunable resolution of a THREE filter will be useful include radar and sonar signal analysis, and identification of spectral lines in doppler-based applications [P. Stoica and R. Moses, *Introduction to Spectral Analysis*, Prentice-Hall, 1997, page 248]. Other areas of potential importance include identification of formants in speech, data decimation [M. A. Hasan and M. R. Azimi-Sadjadi, Separation of multiple time delays using new spectral estimation schemes, IEEE Transactions on Signal Processing 46 (1998), 2618–2630], and nuclear magnetic resonance.

We also disclose that the basic invention could be used as a part of any system for speech compression and speech processing. In particular, in certain applications of speech analysis, such as speaker verification and speech recognition, high quality spectral analysis is needed [Joseph P. Campbell, Jr., Speaker Recognition: A tutorial, Proceedings of the IEEE 85 (1997), 1436–1463], [Jayant M. Naik, Speaker Verification: A tutorial, IEEE Communications Magazine, January 1990, 42–48], [Sadaoki Furui, Recent advances in Speaker Recognition, Lecture Notes in Computer Science 1206, 1997, 237–252], [Hiroaki Sakoe and Seibi Chiba, Dynamic Programming Altorithm Optimization for Spoken Word Recognition, IEEE Transactions on Acoustics, Speech and Signal Processing ASSP-26 (1978), 43–49]. The tuning capabilities of the device should prove especially suitable for such applications. The same holds for analysis of biomedical signals such as EMG and EKG signals.

Figure 1:
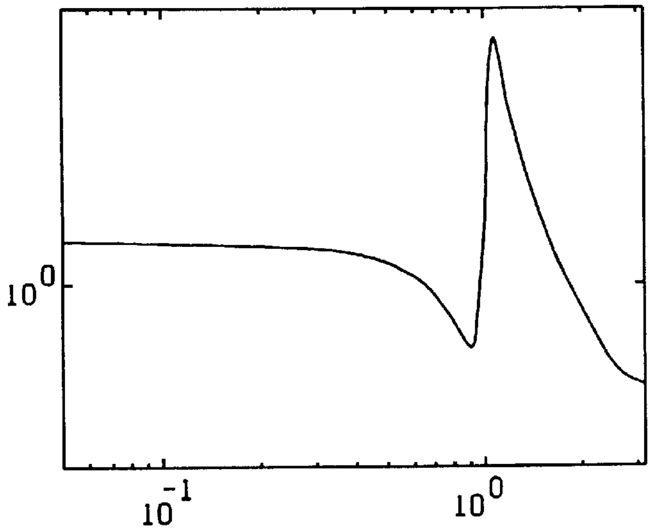
FIG. 1 is a graphical representation of the power spectrum of a sample signal.
Figure 2:
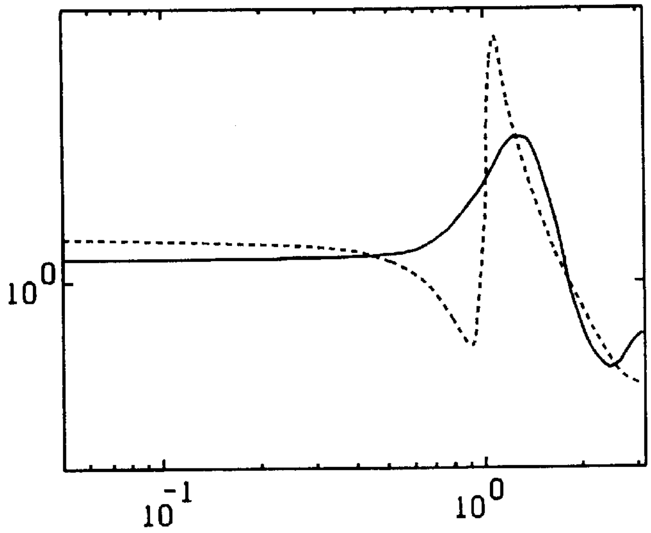
FIG. 2 is a graphical representation of the spectral estimate of the sample signal depicted in FIG. 1 as best matched with an LPC filter.
Figure 3:
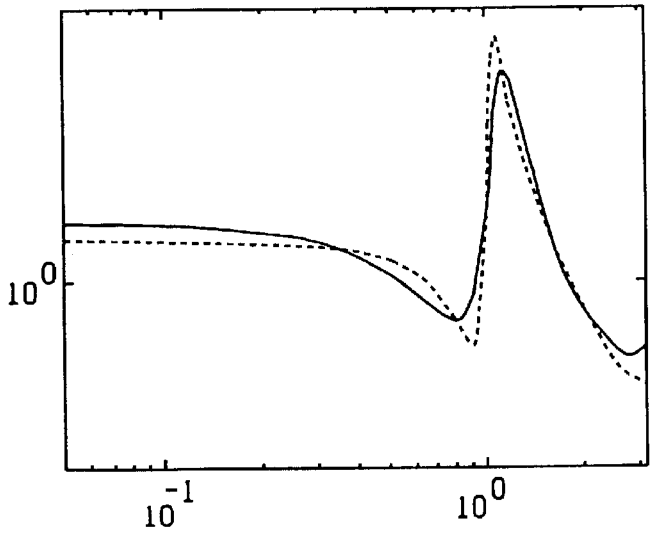
FIG. 3 is a graphical representation of the spectral estimate of the sample signal with true spectrum shown in FIG. 1 (and marked with dotted line here for comparison), as produced with the invention.

The present invention of a THREE filter design retains two important advantages of linear predictive coding. The specified parameters (specs) which appear as coefficients (linear prediction coefficients) in the mathematical description (transfer function) of the LPC filter can be computed by optimizing a (convex) entropy functional. Moreover, the circuit, or integrated circuit device, which implements the LPC filter is designed and fabricated using ordinary skill in the art of electronics (see, e.g., U.S. Pat. Nos. 4,209,836 and 5,048,088) on the basis of the specified parameters (specs). For example, the expression of the specified parameters (specs) is often conveniently displayed in a lattice filter representation of the circuit, containing unit delays $z^{-1}$, summing junctions, and gains. The design of the associated circuit is well within the ordinary skill of a routineer in the art of electronics. In fact, this filter design has been fabricated by Texas Instruments, starting from the lattice filter representation (see, e.g., U.S. Pat. No. 4,344,148), and is used in the LPC speech synthesizer chips TMS 5100, 5200, 5220 (see e.g. D. Quarmby, *Signal Processing Chips*, Prentice-Hall, 1994, pages 27–29).

In order to incorporate zeros as well as poles into digital filter models, it is customary in the prior art to use alternative architectures, for example the lattice-ladder architecture [K. J. Åström, Evaluation of quadratic loss functions for linear systems, in *Fundamentals of Discrete-time systems: A tribute to Professor Eliahu I. Jury*, M. Jamshidi, M. Mansour, and B. D. O. Anderson (editors), IITSI Press, Albuquerque, N. Mex., 1993, pp. 45–56] depicted in FIG. 11.

As for the lattice representation of the LPC filter, the lattice-ladder filter consists of gains, which are the parameter specs, unit delays $z^{-1}$, and summing junctions and therefore can be easily mapped onto a custom chip or onto any programmable digital signal processor (e.g., the Intel 2920, the TMS 320, or the NEC 7720) using ordinary skill in the art; see, e.g. D. Quarmby, *Signal Processing Chips*, Prentice-Hall, 1994, pages 27–29. We observe that the lattice-ladder filter representation is an enhancement of the lattice filter representation, the difference being the incorporation of the spec parameters denoted by β, which allow for the incorporation of zeros into the filter design. In fact, the lattice filter representation of an all-pole filter can be designed from the lattice-ladder filter architecture by setting the parameter specifications: $\beta_0=r_n^{-1/2}$, $\beta_1=\beta_2= \ldots =\beta_n=0$ and $\alpha_k=\gamma_k$ for k=0, 1, . . . , n−1. We note that, in general, the parameters $\alpha_0, \alpha_1, \ldots, \alpha_{n-1}$ are not the reflection coefficients (PARCOR parameters).

As part of this disclosure, we disclose a method and apparatus for determining the gains in a ladder-lattice embodiment of THREE filter from a choice of notches in the power spectrum and of natural frequencies for the bank of filters, as well as a method of automatically tuning these notches and the natural frequencies of the filter bank from the observed data. Similar to the case of LPC filter design, the specs, or coefficients, of the THREE filter are also computed by optimizing a (convex) generalized entropy functional. One might consider an alternative design using adaptive linear filters to tune the parameters in the lattice-ladder filter embodiment of an autoregressive moving-average (ARMA) model of a measured input-output history, as has been done in [M. G. Bellanger, Computational complexity and accuracy issues in fast least squares algorithms for adaptive filtering, Proc. 1988 IEEE International Symposium on Circuits and Systems, Espoo, Finland, Jun. 7–9, 1988] for either lattice or ladder filter tuning. However, one should note that the input string which might generate the observed output string is not necessarily known, nor is it necessarily available, in all situations to which THREE filter methods apply (e.g., speech synthesis). For this reason, one might then consider developing a tuning method for the lattice-ladder filter parameters using a system identification scheme based on an autoregressive moving-average with exogenous variables (ARMAX). However, the theory of system identification teaches that these optimization schemes are nonlinear but nonconvex [T. Söderström and P. Stoica, *Systems Identification*, Prentice-Hall, New York, 1989, page 333, equations (9.47), and page 334, equations (9.48)]. Moreover, the theory teaches that there are examples where global convergence of the associated algorithms may fail depending on the choice of certain design parameters (e.g., forgetting factors) in the standard algorithm [T. S öderström and P. Stoica, op. cit., page 340, Example 9.6]—in sharp contrast to the convex minimization scheme we disclose for the lattice-ladder parameters realizing a THREE filter. In addition, ARMAX schemes will not necessarily match the notches of the power spectrum. Finally, we disclose here that our extensive experimentation with both methods for problems of formant identification show that ARMAX methods require significantly higher order filters to begin to identify formants, and also lead to the introduction of spurious formants, in cases where THREE filter methods converge quite quickly and reliably.

We now disclose a new method and apparatus for encoding and reproducing time signals, as well as for spectral analysis of signals. The method and apparatus, which we refer to as the Tunable High Resolution Estimator (THREE), is especially suitable for processing and analyzing short observation records.

The basic parts of the THREE are: the Encoder, the Signal Synthesizer, and the Spectral Analyzer. The Encoder samples and processes a time signal (e.g., speech, radar, recordings, etc.) and produces a set of parameters which are made available to the Signal Synthesizer and the Spectral Analyzer. The Signal Synthesizer reproduces the time signal from these parameters. From the same parameters, the Spectral Analyzer generates the power spectrum of the time-signal.

The design of each of these components is disclosed with both fixed-mode and tunable features. Therefore, an essential property of the apparatus is that the performance of the different components can be enhanced for specific applications by tuning two sets of tunable parameters, referred to as the filter-bank poles $p=(p_0, p_1, \ldots, p_n)$ and the MA parameters $r=(r_1, r_2, \ldots, r_n)$ respectively. In this disclosure we shall teach how the value of these parameters can be (a) set to fixed "default" values, and (b) tuned to give improved resolution at selected portions of the power spectrum, based on a priori information about the nature of the application, the time signal, and statistical considerations. In both cases, we disclose what we believe to be the preferred embodiments for either setting or tuning the parameters.

As noted herein, the THREE filter is tunable. However, in its simplest embodiment, the tunable feature of the filter may be eliminated so that the invention incorporates in essence a high resolution estimator (HREE) filter. In this embodiment the default settings, or a priori information, is used to preselect the frequencies of interest. As can be appreciated by those of ordinary skill in the art, in many applications this a priori information is available and does not detract from the effective operation of the invention. Indeed the tunable feature is not needed for these applications. Another advantage of not utilizing the tunable aspect of the invention is that faster operation is achieved. This increased operational speed may be more important for some applications, such as those which operate in real time, rather than the increased accuracy of signal reproduction expected with tuning. This speed advantage is expected to become less important as the electronics available for implementation are further improved.

The intended use of the apparatus is to achieve one or both of the following objectives: (1) a time signal is analyzed by the Encoder and the set of parameters are encoded, and transmitted or stored. Then the Signal Synthesizer is used to reproduce the time signal; and/or (2) a time signal is analyzed by the Encoder and the set of parameters are encoded, and transmitted or stored. Then the Spectral Analyzer is used to identify the power spectrum of time signal over selected frequency bands.

These two objectives could be achieved in parallel, and in fact, data produced in conjunction with (2) may be used to obtain more accurate estimates of the MA parameters, and thereby improve the performance of the time synthesizer in objective (1). Therefore, a method for updating the MA parameters on-line is also disclosed.

The Encoder. Long samples of data, as in speech processing, are divided into windows or frames (in speech typically a few 10 ms.), on which the process can be regarded as being stationary. The procedure of doing this is well-known in the art [T. P. Barnwell III, K. Nayebi and C. H. Richardson, *Speech Coding: A Computer Laboratory Textbook*, John Wiley & Sons, New York, 1996]. The time signal in each frame is sampled, digitized, and de-trended (i.e., the mean value subtracted) to produce a (stationary) finite time series $$y(0), y(1), \ldots, y(N). \quad (2.1)$$

Figure 12:
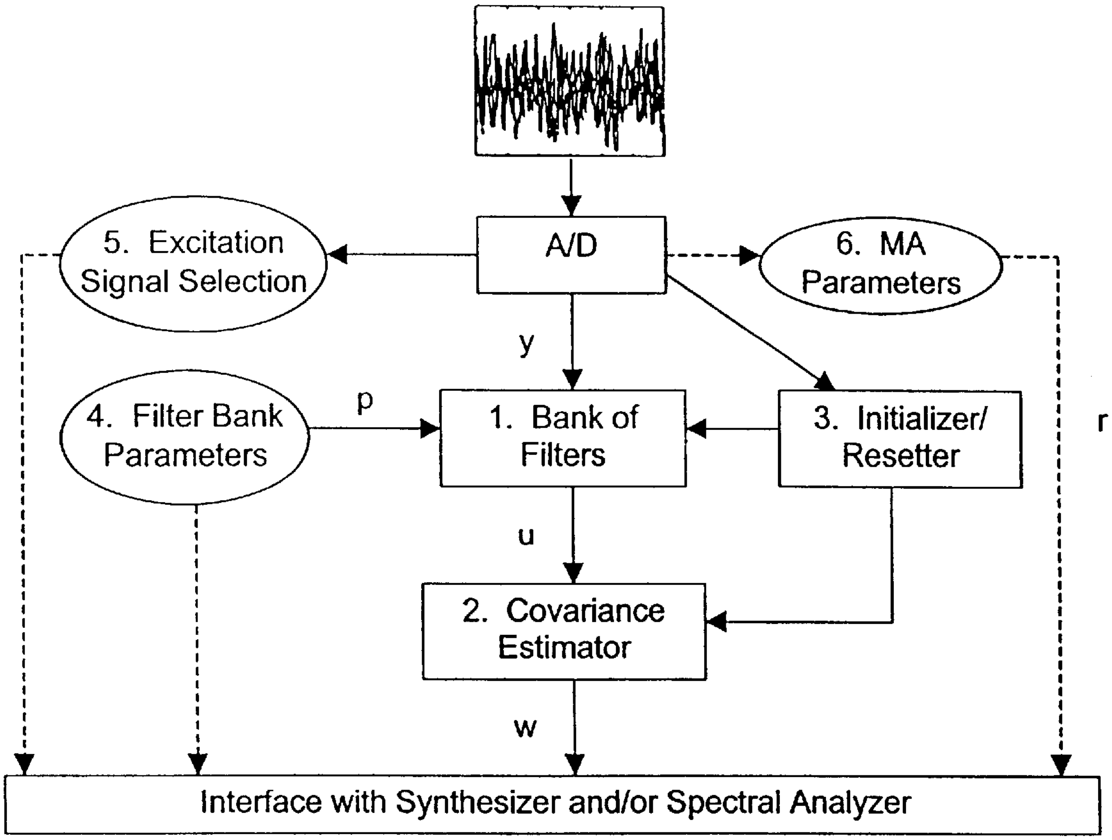
FIG. 12 is a block diagram of a signal encoder portion of the present invention.

This is done in the box designated as A/D in FIG. 12. This is standard in the art [T. P. Barnwell III, K. Nayebi and C. H. Richardson, *Speech Coding: A Computer Laboratory Textbook*, John Wiley & Sons, New York, 1996]. The separation of window frames is decided by the Initializer/Resetter, which is Component 3 in FIG. 12. The central component of the Encoder is the Filter Bank, given as Component 1. This consists of a collection of n+1 low-order filters, preferably first order filters, which process the observed time series in parallel. The output of the Filter Bank consists of the individual outputs compiled into a time sequence of vectors $$\begin{bmatrix} u_0(t_0) \\ u_1(t_0) \\ \vdots \\ u_n(t_0) \end{bmatrix}, \begin{bmatrix} u_0(t_0+1) \\ u_1(t_0+1) \\ \vdots \\ u_n(t_0+1) \end{bmatrix}, \ldots, \begin{bmatrix} u_0(N) \\ u_1(N) \\ \vdots \\ u_n(N) \end{bmatrix} \quad (2.2)$$

The choice of starting point to will be discussed in the description of Component 2.

As will be exolained in the description of Component 7, the Filter Bank is completely specified by a set $p=(p_0, p_1, \ldots, p_n)$ of complex numbers. As mentioned above, these numbers can either be set to default values, determined automatically from the rules disclosed below, or tuned to desired values, using an alternative set of rules which are also disclosed below. Component 2 in FIG. 12, indicated as Covariance Estimator, produces from the sequence u(t) in (2.2) a set of n+1 complex numbers $$w=(w_0, w_1, \ldots, w_n) \quad (2.3)$$

which are coded and passed on via a suitable interface to the Signal Synthesizer and the Spectral Analyzer. It should be noted that both sets p and w are self-conjugate. Hence, for each of them, the information of their actual values is carried by n+1 real numbers.

Two additional features which are optional, are indicated in FIG. 12 by dashed lines. First, Component 5, designated as Excitation Signal Selection, refers to a class of procedures to be discussed below, which provide the modeling filter (Component 9) of the signal Synthesizer with an appropriate input signal. Second, Component 6, designated as MA Parameters in FIG. 12, refers to a class of procedures for determining n real numbers $$r=(r_1, r_2, \ldots r_n), \quad (2.4)$$

the so-called MA parameters, to be defined below.

The Signal Synthesizer. The core component of the Signal Synthesizer is the Decoder, given as Component 7 in FIG. 13, and described in detail below. This component can be implemented in a variety of ways, and its purpose is to integrate the values w, p and r into a set of n+1 real parameters $$a=(a_0, a_1, \ldots, a_n), \quad (2.5)$$

called the AR parameters. This set along with parameters r are fed into Component 8, called Parameter Transformer in FIG. 13, to determine suitable ARMA parameters for Component 9, which is a standard modeling filter to be described below. The modeling filter is driven by an excitation signal produced by Component 5'.

Figure 14:
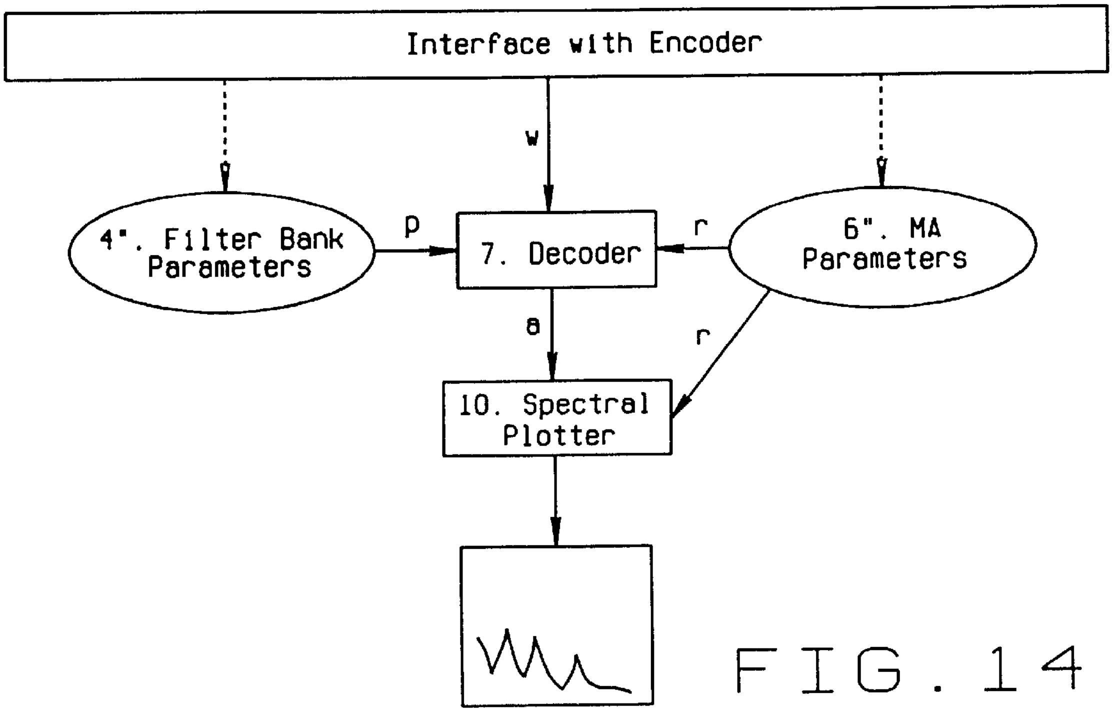
FIG. 14 is a block diagram of a spectral analyzer portion of the present invention.

The Spectral Analyzer. The core component of the Spectral Analyzer is again the Decoder, given as Component 7 in FIG. 14. The output of the Decoder is the set of AR parameters used by the ARMA modeling filter (Component 10) for generating the power spectrum. Two optional features are driven by the Component 10. Spectral estimates can be used to identify suitable updates for the MA parameters and/or updates of the Filter Bank parameters. The latter option may be exercised when, for instance, increased resolution is desired over an identified frequency band.

Components. Now described in detail are the key components of the parts and their function. They are discussed in the same order as they have been enumerated in FIGS. 12–14.

Figure 15:
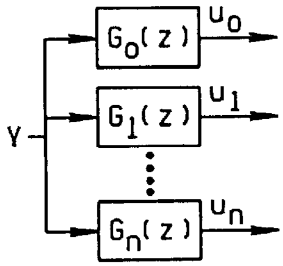
FIG. 15 is a block diagram of a bank of filters, preferably first order filters, as utilized in the encoder portion of the present invention.

Bank of Filters. The core component of the Encoder is a bank of n+1 filters with transfer functions $$G_k(z) = \frac{z}{z-p_k}, \quad k = 0, 1, 2, \ldots,$$

where the filter-bank poles $p_0, p_1, \ldots, p_n$ are available for tuning. The poles are taken to be distinct and one of them, $p_0$ at the origin, i.e. $p_0=0$. As shown in FIG. 15, these filters process in parallel the input time series (2.1), each yielding an output $u_k$ satisfying the recursion $$u_k(t)=p_k u_k(t-1)+y(t). \quad (2.6)$$

Clearly, $u_0=y$. If $p_k$ is a real number, this is a standard first-order filter. If $p_k$ is complex, $$u_k(t):=\xi_k(t)+i\eta_k(t)$$

can be obtained via the second order filter $$\begin{bmatrix} \xi_k(t) \\ \eta_k(t) \end{bmatrix} = \begin{bmatrix} a & -b \\ b & a \end{bmatrix} \begin{bmatrix} \xi_k(t-1) \\ \eta_k(t-1) \end{bmatrix} + \begin{bmatrix} 1 \\ 0 \end{bmatrix} y(t), \quad (2.7)$$

where $p_k=a+ib$. Since complex filter-bank poles occur in conjugate pairs a±ib, and since the filter with the pole $p_l=a-ib$ produces the output $$u_k(t):=\xi_k(t)-i\eta_k(t)$$

the same second order filter (2.7) replaces two complex one-order filters. We also disclose that for tunability of the apparatus to specific applications there may also be switches at the input buffer so that one or more filters in the bank can be turned off. The hardware implementation of such a filter bank is standard in the art.

The key theoretical idea on which our design relies, described in C. I. Byrnes, T. T. Georgiou, and A. Lindquist, *A new approach to Spectral Estimation: A tunable high-resolution spectral estimator*, preprint, is the following:

Given the unique proper rational function f(z) with all poles in the unit disc $\{z||z|<1\}$ such that $$\Phi(e^{i\theta}):=f(e^{i\theta})+f(e^{-i\theta}),\ -\pi\leq\theta\leq\pi \tag{2.8}$$

is the power spectrum of y, it can be shown that $$f(p_k^{-1}) = \frac{1}{2}(1-p_k^2)E\{u_k(t)^2\},\ t\geq t_0, \tag{2.9}$$

where $E\{\cdot\}$ is mathematical expectation, provided to is chosen large enough for the filters to have reached steady state so that (2.2) is a stationary process; see C. I. Byrnes, T. T. Georgiou, and A. Lindquist, *A new approach to Spectral Estimation: A tunable high-resolution spectral estimator*, preprint. The idea is to estimate the variances $$c_0(u_k):=E\{u_k(t)^2\},\ k=0, 1, \ldots, n$$

from output data, as explained under point 2 below, to yield interpolation conditions $$f(z_k)=w_k,\ k=0, 1, \ldots, n \text{ where } z_k=p_k^{-1}$$

from which the function f(z), and hence the power spectrum $\Phi$ can be determined. The theory described in C. I. Byrnes, T. T. Georgiou, and A. Lindauist, *A new approach to Spectral Estimation: A tunable high-resolution spectral estimator*, preprint teaches that there is not a unique such f(z), and our procedure allows for making a choice which fulfills other design specifications.

Covariance Estimator. Estimation of the variance $$c_0(v):=E\{v(t)^2\}$$

of a stationary stochastic process v(t) from an observation record $$v_0, v_1, v_2, \ldots, v_N$$

can be done in a variety of ways. The preferred procedure is to evaluate $$\hat{c}_0(v) := \frac{1}{N+1}\sum_{t=o}^{N} v_t^2 \tag{2.10}$$

over the available frame.

In the present application, the variances $\hat{c}_0(u_0)$, $\hat{c}_0(u_1)$ . . . , $\hat{c}_0(u_n)$ are estimated and the numbers (2.3) are formed as $$w_k := \frac{1}{2}(1-p_k^2)\hat{c}_0(u_k),\quad k=0, 1, \ldots, n. \tag{2.11}$$

Complex arithmetic is preferred, but, if real filter parameters are desired, the output of the second-order filter (2.7) can be processed by noting that $$c_0(u_k):=c_0(\xi_k)-c_0(\eta_k)+2i\,\mathrm{cov}(\xi_k, \eta_k),$$

where $\mathrm{cov}(\xi_k, \eta_k):=E\{\xi_k(t)\eta_k(t)\}$ is estimated by a mixed ergodic sum formed in analogy with (2.10).

Before delivering $w=(w_0, w_1, \ldots, w_n)$ as the output, check that the Pick matrix $$P = \left[\frac{w_j+\bar{w}_k}{1-p_j\bar{p}_k}\right]_{j,k=0}^{n}$$

is positive definite. If not, exchange $w_k$ for $w_k+\lambda$ for k=0, 1, . . . , n, where $\lambda$ is larger than the absolute value of the smallest eigenvalue of $PP_0^{-1}$, where $$P_0 = \left[\frac{2}{1-p_j\bar{p}_k}\right]_{j,k=0}^{n}$$

Initializer/Resetter. The purpose of this component is to identify and truncate portions of an incoming time series to produce windows of data (2.1), over which windows the series is stationary. This is standard in the art [T. P. Barnwell III, K. Nayebi and C. H. Richardson, *Speech Coding: A Computer Laboratory Textbook*, John Wiley & Sons, New York, 1996]. At the beginning of each window it also initializes the states of the Filter Bank to zero, as well as resets summation buffers in the Covariance Estimator (Component 2).

Filter Bank Parameters. The theory described in C. I. Byrnes, T. T. Georgiou, and A. Lindquist, *A new approach to Spectral Estimation: A tunable high-resolution spectral estimator*, preprint, requires that the pole of one of the filters in the bank be at z=0 for normalization purposes; we take this to be $p_0$. The location of the poles of the other filters in the bank represents a design trade-off. The presence of Filter Bank poles close to a selected arc $\{e^{i\theta}/\theta\in[\theta_1, \theta_2]\}$ of the unit circle, allows for high resolution over the corresponding frequency band. However, proximity of the poles to the unit circle may be responsible for deterioration of the variability of the covariance estimates obtained by Component 2.

There are two observations which are useful in addressing the design trade-off. First, the size n of the data bank is dictated by the quality of the desired reproduction of the spectrum and the expected complexity of it. For instance, if the spectrum is expected to have k spectral lines or formants within the targeted frequency band, typically, a filter of order n=2k+2 is required for reasonable reproduction of the characteristics.

Second, if N is the length of the window frame, a useful rule of thumb is to place the poles within $$|p| < 10^{-\frac{10}{N}}.$$

This guarantees that the output of the filter bank attains stationarity in about 1/10 of the length of the window frame. Accordingly the Covariance Estimator may be activated to operate on the later 90% stationary portion of the processed window frame. Hence, $t_0$ in (2.2) can be taken to be the smallest integer larger than $$\frac{N}{10}.$$

This typically gives a slight improvement as compared to the Covariance Estimator processing the complete processed window frame.

There is a variety of ways to take advantage of the design trade-offs. We now disclose what we believe are the best available rules to automatically determine a default setting of the bank of filter poles, as well as to automatically determine the setting of the bank of filter poles given a priori information on a bandwidth of frequencies on which higher resolution is desired.

Default Values.

(a) One pole is chosen at the origin, (b) choose one or two real poles at $$p = \pm 10^{\frac{10}{N}}$$

(c) choose an even number of equally spaced poles on the circumference of a circle with radius $$10^{-\frac{10}{N}},$$

in a Butterworth-like pattern with angles spanning the range of frequencies where increased resolution is desired.

The total number of elements in the filter bank should be at least equal to the number suggested earlier, e.g., two times the number of formants expected in the signal plus two.

In the tunable case, it may be necessary to switch off one or more of the filters in the bank.

Figure 4:
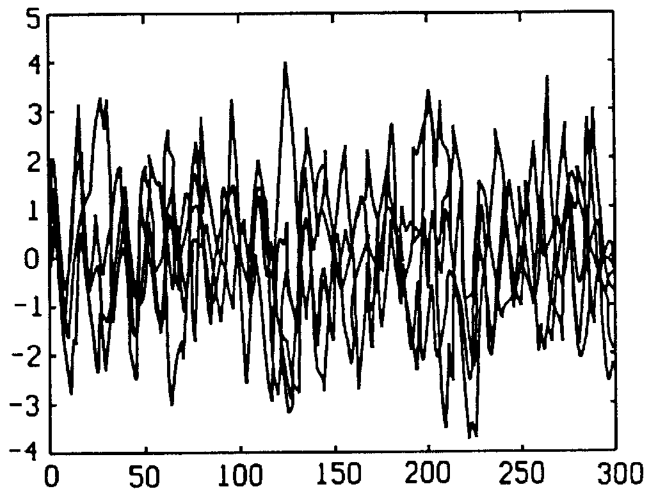
FIG. 4 is a graphical representation of five sample signals comprised of the superposition of two sinusoids with colored noise.
Figure 5:
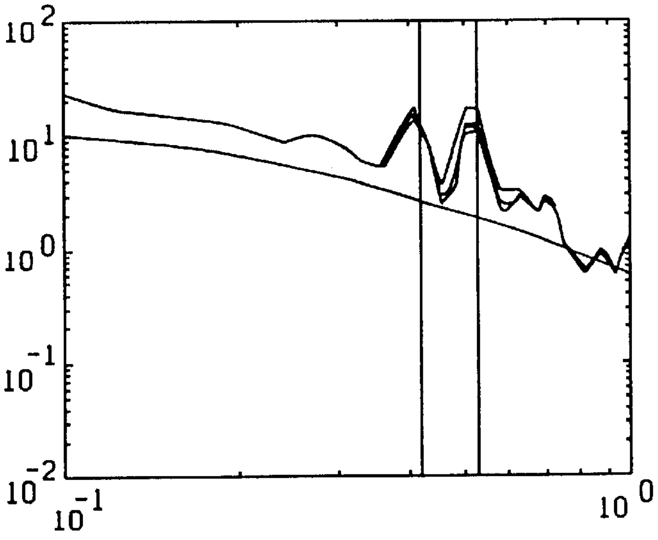
FIG. 5 PRIOR ART
FIG. 5 is a graphical representation of the five periodograms corresponding to the sample signals of FIG. 4.
Figure 6:
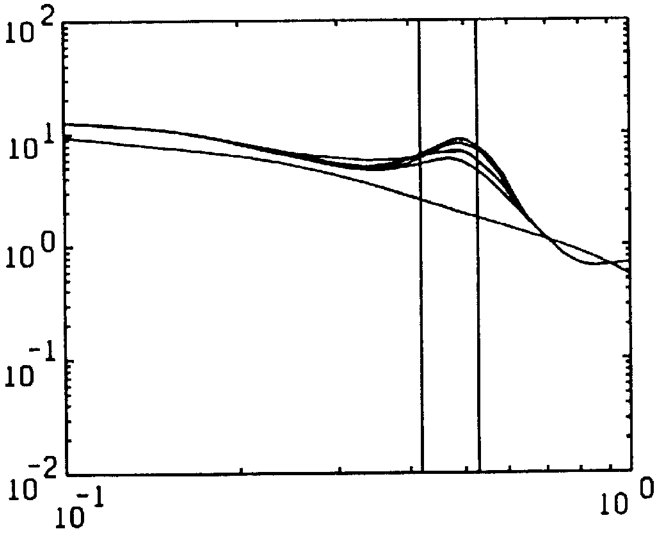
FIG. 6 PRIOR ART
FIG. 6 is a graphical representation of the five corresponding power spectra obtained through LPC filter design for the five sample signals of FIG. 4.
Figure 16:
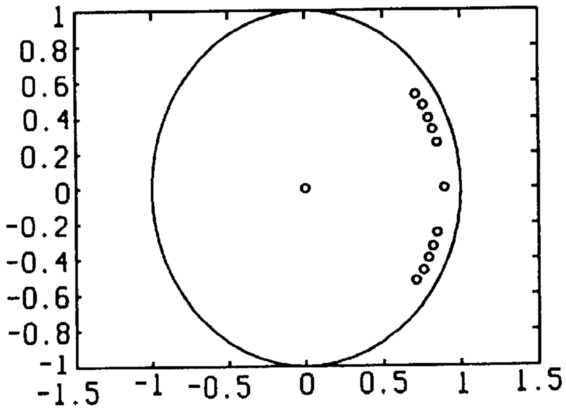
FIG. 16 is a graphical representation of a unit circle indicating the relative location of poles for one embodiment of the present invention.

As an illustration, take the signal of two sinusoidal components in colored noise depicted in FIG. 4. More specifically, in this example, $$y(t)=0.5\sin(\omega_1 t+\phi_1)+0.5\sin(\omega_2 t+\phi_2)+z(t)\quad t=0, 1, 2, \ldots,$$

$$z(t)=0.8z(t-1)+0.5v(t)+0.25v(t-1)$$

with $\omega_1=0.42$, $\omega_2=0.53$, and $\phi_1$, $\phi_2$ and $v(t)$ independent N(0, 1) random variables, i.e., with zero mean and unit variance. The squares in FIG. 16 indicate suggested position of filter bank poles in order to attain sufficient resolution over the frequency band [0.4 0.5] so as to resolve spectral lines situated there and indicated by 0. The position of the poles on the circle $|z|=0.9$ is dictated by the length N~300 for the time series window.

Figure 7:
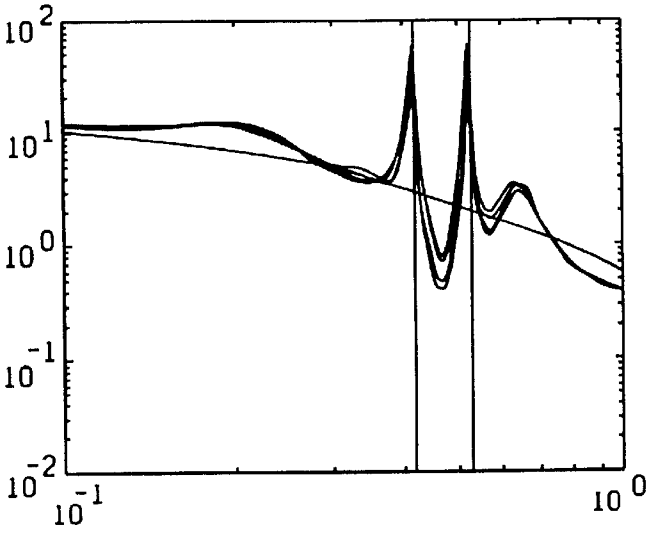
FIG. 7 is a graphical representation of the five corresponding power spectra obtained through the invention filter design.
Figure 8:
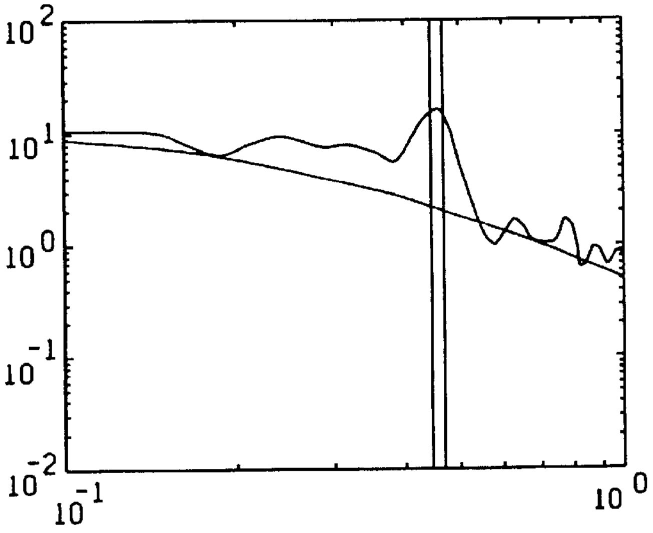
FIG. 8 is a graphical representation of a power spectrum estimated from a time signal with two closely spaced sinusoids (marked by vertical lines), using periodogram.
Figure 9:
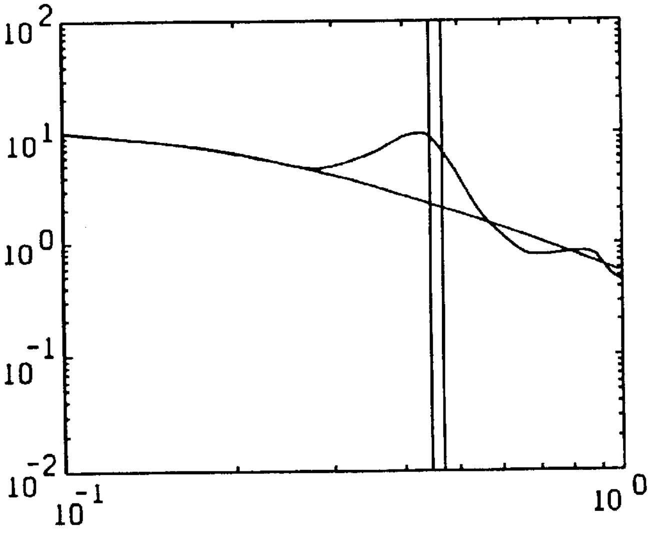
FIG. 9 PRIOR ART
FIG. 9 is a graphical representation of a power spectrum estimated from a time signal with two closely spaced sinusoids (marked by vertical lines), using LPC design.
Figure 10:
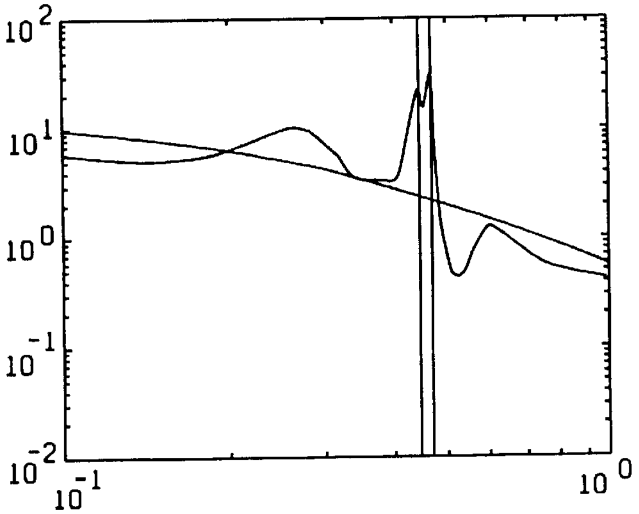
FIG. 10 is a graphical representation of a power spectrum estimated from a time signal with two closely spaced sinusoids (marked by vertical lines), using the invention.

A THREE filter is determined by the choice of filter-bank poles and a choice of MA parameters. The comparison of the original line spectra with the power spectrum of the THREE filter determined by these filter-bank poles and the default value of the MA parameters, discussed below, is depicted in FIG. 7.

Excitation Signal Selection. An excitation signal is needed in conjunction with the time synthesizer and is marked as Component 5'. For some applications the generic choice of white noise may be satisfactory, but in general, and especially in speech it is a standard practice in vocoder design to include a special excitation signal selection. Tnhis is standard in the art [T. P. Barnwell III, K. Nayebi and C. H. Richardson, *Speech Coding: A Computer Laboratory Textbook*, John Wiley & Sons, New York, 1996, page 101 and pages 129–132]when applied to LPC filters and can also be implemented for general digital filters. The general idea adapted to our situation requires the following implementation.

Component 5 in FIG. 12 includes a copy of the time synthesizer. That is, it receives as input the values w, p, and r, along with the time series y. It generates the coefficients a of the ARMA model precisely as the decoding section of the time synthesizer. Then it processes the time series through a filter which is the inverse of this ARMA modeling filter. The "approximately whitened" signal is compared to a collection of stored excitation signals. A code identifying the optimal matching is transmitted to the time synthesizer. This code is then used to retrieve the same excitation signal to be used as an input to the modeling filter (Component 9 in FIG. 13).

Excitation signal selection is not needed if only the frequency synthesizer is used.

MA Parameter Selection. As for the filter-bank poles, the MA parameters can either be directly tuned using special knowledge of spectral zeros present in the particular application or set to a default value. However, based on available data (2.1), the MA parameter selection can also be done on-line, as described in Appendix A.

There are several possible approaches to determining a default value. For example, the choice $r_1=r_2=\ldots=r_n=0$ produces a purely autoregressive (AR) model which, however, is different from the LPC filter since it interpolates the filter-bank data rather than matching the covariance lags of the original process.

We now disclose what we believe is the best available method for determining the default values of the MA parameters. Choose $r_1, r_2, \ldots, r_n$ so that $$z^n+r_1z^{n-1}+\ldots+r_n=(z-p_1)(z-p_2)\ldots(z-p_n), \tag{2.12}$$

which corresponds to the central solution, described in Section 3. This setting is especially easily implemented, as disclosed below.

Decoder. Given p, w, and r, the Decoder determines n+1 real numbers $$a_0, a_1, a_2, \ldots, a_n \tag{2.13}$$

with the property that the polynomial $$\alpha(z):=a_0z^n+a_1z^{n-1}+\ldots+a_n$$

has all its roots less than one in absolute value. This is done by solving a convex optimization problem via an algorithm presented in papers C. I. Byrnes, T. T. Georgiou, and A. Lindquist, *A generalized entropy criterion for Nevanlinna-Pick interpolation: A convex optimization approach to certain problems in systems and control*, preprint, and C. I. Byrnes, T. T. Georgiou, and A. Lindquist, *A new approach to Spectral Estimation: A tunable high-resolution spectral estimator*, preprint. While our disclosure teaches how to determine the THREE filter parameters on-Line in the section on the Decoder algorithms, an alternative method and apparatus can be developed off-line by first producing a look-up table. The on-line algorithm has been programmed in MATLAB, and the code is enclosed in the Appendix B.

For the default choice (2.12) of MA-parameters, a much simpler algorithm is available, and it is also presented in the section on the Decoder algorithms. The MATLAB code for this algorithm is also enclosed in the Appendix B.

Figure 13:
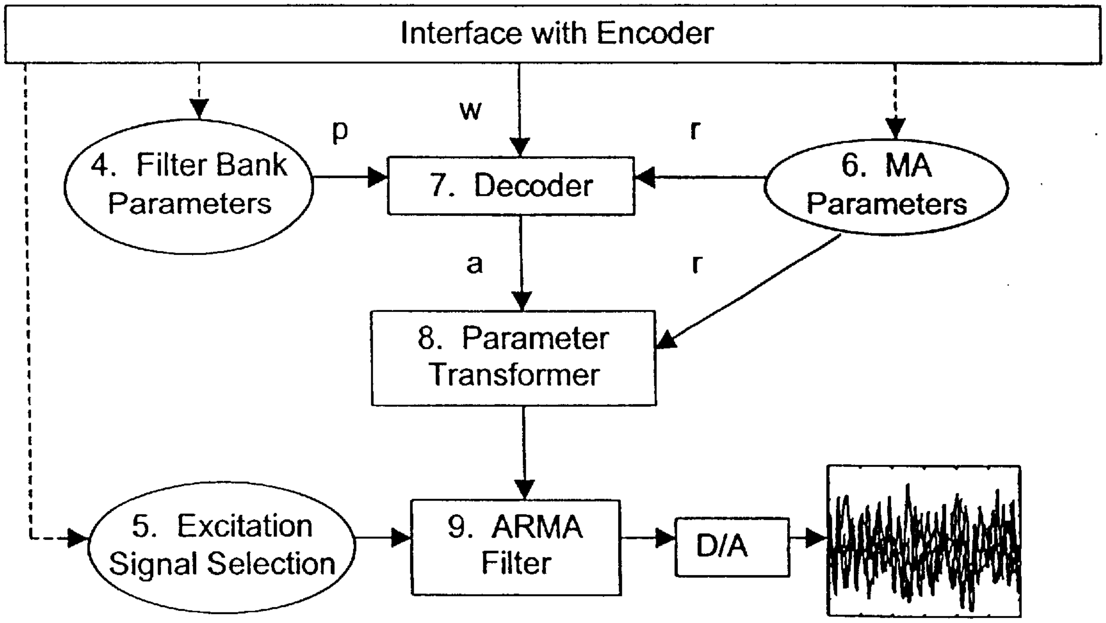
FIG. 13 is a block diagram of a signal synthesizer portion of the present invention.

Parameter Transformer. The purpose of Component 8 in FIG. 13 is to compute the filter gains for a modelihg filter with transfer function $$R(z)=\frac{z^n+r_1z^{n-1}+\ldots+r_n}{a_0z^n+a_1z^{n-1}+\ldots+a_n}, \tag{2.14}$$

where $r_1, r_2, \ldots, r_n$ are the MA parameters delivered by Component 6 (as for the Signal Synthesizer) or Component 6' (in the Spectral Analyzer) and $a_0, a_1, \ldots, a_n$ delivered from the Decoder (Component 7). This can be done in many different ways [L. A. Chua, C. A. Desoer and E. S. Kuh, *Linear and Nonlinear Circuits*, McGraw-Hiil, 1989], depending on desired filter architecture.

Figure 11:
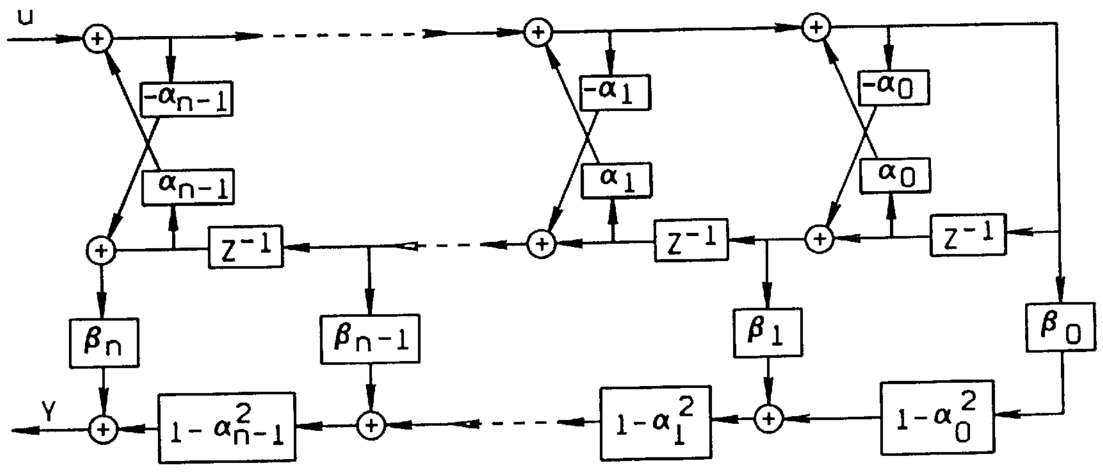
FIG. 11 PRIOR ART
FIG. 11 is a schematic representation of a lattice-ladder filter in accordance with the present invention.

A filter design which is especially suitable for an apparatus with variable dimension is the lattice-ladder architecture depicted in FIG. 11. In this case, the gain parameters $\alpha_0, \alpha_1, \ldots, \alpha_{n-1}$ and $\beta_0, \beta_1, \ldots, \beta_n$ are chosen in the following way. For k=n, n−1, . . . , 1, solve the recursions $$\begin{cases} a_{k-1,j} = a_{kj} + a_{k-1} a_{k,k-j},\ a_{nj} = a_j \\ a_{k-1} = -\dfrac{a_{kk}}{a_{k0}} \\ r_{k-1,j} = r_{kj} - \beta_k a_{k,k-j},\ r_{nj} = r_j \\ \beta_k = \dfrac{r_{kk}}{a_{k0}} \end{cases} \tag{2.15}$$

for j=0, 1, . . . , k, and set $$\beta_0 = \frac{r_{00}}{a_{00}}.$$

This is a well-known procedure; see, e.g., K. J. Aström, Introduction to stochastic realization theory, Academic Press, 1970; and K. J. Aström, Evaluation of quadratic loss functions of linear systems, in *Fundamentals of Discrete-time systems: A tribute to Professor Eliahu I. Jury*, M. Jarnshidi, M. Mansour, and B. D. O. Anderson (editors), IITSI Press, Albuquerque, N. Mex., 1993, pp. 45–56. The algorithm is recursive, using only ordinary arithmetic operations, and can be implemented with an MAC mathematics processing chip using ordinary skill in the art.

ARMA filter. An ARMA modeling filter consists of gains, unit delays $z^{-1}$, and summing junctions, and can therefore easily be mapped onto a custom chip or any programmable digital signal processor using ordinary skill in the art. The preferred filter design, which easily can be adjusted to different values of the dimension n, is depicted in FIG. 11. If the AR setting $r_1=r_2=\ldots=r_n=0$ of the MA parameters has been selected, $\beta_0=r_n^{-1/2}$, $\beta_1=\beta_2=\ldots=\beta_n=0$ and $\alpha_k=\gamma_k$ for k=0, 1, . . . , n−1, where $\gamma_k$, k=0, 1, . . . , n−1, are the first n PARCOR parameters and the algorithm (2.15) reduces to the Levinson algorithm [B. Porat, *digital Processing of Random Signals*, Prentice-Hall, 1994; and P. Stoica and R. Moses, Introduction to Spectral Analysis, Prentice-Hall, 1997].

Spectral plotter. The Spectral Plotter amounts to numerical implementation of the evaluation $\Phi(e^{i\theta}):=|R(e^{i\theta})|^2$, where R(z) is defined by (2.14), and θ ranges over the desired portion of the spectrum. This evaluation can be efficiently computed using standard FFT transform [P. Stoica and R. Moses, Introduction to Spectral Anqalysis, Prentice-Hall, 1997]. For instance, the evaluation of a polynomial (3.4) over a frequency range $z=e^{i\theta}$, with $\theta\in\{0, \Delta\theta, \ldots, 2\pi-\Delta\theta\}$ and $\Delta\theta=2\pi/M$, can be conveniently computed by obtaining the discrete Fourier transform of $$(a_n, \ldots, a_1, 1, 0, \ldots, 0).$$

This is the coefficient vector padded with M−n−1 zeros. The discrete Fourier transform can be implemented using the FFT algorithm in standard form.

Decoder Algorithms. We now disclose the algorithms used for the Decoder. The input data consists of (i) the filter-bank poles $p=(p_0, p_1, \ldots, p_n)$, which are represented as the roots of a polynomial $$\tau(z) := \prod_{k=1}^{n} (z-p_k) = z^n + \tau_1 z^{n-1} + \ldots + \tau_{n-1} z + \tau_n, \tag{3.1}$$

(ii) the MA parameters $r=(r_1, r_2, \ldots, r_n)$, which are real numbers such that the polynomial $$\rho(z)=z^n+r_1z^{n-1}+\ldots+r_{n-1}z+r_n \tag{3.2}$$

has all its roots less than one in absolute value, and (iii) the complex numbers $$w=(w_0, w_1, \ldots, w_n) \tag{3.3}$$

determined as (2.11) in the Covariance Estimator.

The problem is to find AR parameters $a=(a_0, a_1, \ldots, a_n)$, real numbers with the property that the polynomial $$\alpha(z)=a_0z^n+a_1z^{n-1}+\ldots+a_{n-1}z+a_n \tag{3.4}$$

has all its roots less than one in absolute value, such that $$\left|\frac{\rho(e^{i\theta})}{\alpha(e^{i\theta})}\right|^2$$

is a good approximation of the power spectrum $\Phi(e^{i\theta})$ of the process y in some desired part of the spectrum $\theta\in[-\pi,\pi]$. More precisely, we need to determine the function f(z) in (2.8). Mathematically, this problem amounts to finding a polynomial (3.4) and a corresponding polynomial $$\beta(z)=b_0z^n+b_1z^{n-1}+\ldots+b_{n-1}z+b_n, \tag{3.5}$$

satisfying $$\alpha(z)\beta(z^{-1})+\beta(z)a(z^{-1})=\rho(z)\rho(z^{-1}) \tag{3.6}$$

such that the rational function $$f(z) = \frac{\beta(z)}{a(z)} \tag{3.7}$$

satisfies the interpolation condition $$f(z_k)=w_k,\ k=0, 1, \ldots, n \text{ where } z_k=p_k^{-1}. \tag{3.8}$$

For this purpose the parameters p and r are available for tuning. If the choice of r corresponds to the default value, $r_k=\tau_k$ for k=1, 2, . . . , n (i.e., taking $\rho(z)=\tau(z)$), the determination of the THREE filter parameters is considerably simplified. The default option is disclosed in the next subsection. The method for determining the THREE filter parameters in the tunable case is disclosed in the subsection following the next. Detailed theoretical descriptions of the method, which is based on convex optimization, are given in the papers [C. I. Byrnes, T. T. Georgiou, and A. Lindquist, *A generalized entropy criterion for Nevanlinna-Pick interpolation: A convex optimization approach to certain problems in systems and control*, preprint, and C. I. Byrnes, T. T. Georgiou, and A. Lindquist, *A new approach to Spectral Estimation: A tunable high-resolution spectral estimator*, preprint].

The central solution algorithm for the default filter. In the special case in which the MA parameters $r=(r_1, r_2, \ldots, r_n)$ are set equal to the coefficients of the polynomial (3.1), i.e., when $\rho(z)=\tau(z)$, a simpler algorithm is available. Here we disclose such an algorithm which is particularly suited to our application. Given the filter-bank parameters $p_0, p_1, \ldots, p_n$ and the interpolation values $w_0, w_1, \ldots, w_n$, determine two sets of parameters $s_1, s_2, \ldots, s_n$ and $v_1, v_2, \ldots, v_n$ defined as $$s_k = \frac{1-p_k}{1+p_k} \quad \text{and} \quad v_k = \frac{1-w_k/w_0}{1+w_k/w_0} \quad k = 1, 2, \cdots, n$$

and the coefficients $\sigma_1, \sigma_2, \ldots, \sigma_n$ of the polynomial $$\sigma(s)=(s-s_1)(s-s_2)\ldots(s-s_n)=s^n+\sigma_1 s^{n-1}+\ldots+\sigma_n.$$

We need a rational function $$p(s) := \frac{x_1 s^{n-1} + \cdots + x_n}{s^n + \sigma_1 s^{n-1} + \cdots + \sigma_n}$$

such that $$p(s_k)=v_k \quad k=1, 2, \ldots, n,$$

and a realization $p(z)=c(sI-A)^{-1}b$, where $$A = \begin{bmatrix} -\sigma_1 & -\sigma_2 & \cdots & -\sigma_{n-1} & -\sigma_n \\ 1 & 0 & \cdots & 0 & 0 \\ 0 & 1 & \cdots & 0 & 0 \\ \vdots & \vdots & \ddots & \vdots & \vdots \\ 0 & 0 & \cdots & 1 & 0 \end{bmatrix},$$

and the n-vector b remains to be determined. To this end, choose a (reindexed) subset $s_1, s_2, \ldots, s_m$ of the parameters $s_1, s_2, \ldots, s_n$, including one and only one $s_k$ from each complex pair $(s_k, \bar{s}_k)$, and decompose the following complex Vandermonde matrix and complex vector into their real and imaginary parts:

$$\begin{bmatrix} s_1^{n-1} & s_1^{n-2} & \cdots & 1 \\ s_2^{n-1} & s_2^{n-2} & \cdots & 1 \\ \vdots & \vdots & \ddots & \vdots \\ s_m^{n-1} & s_m^{n-2} & \cdots & 1 \end{bmatrix} = U_r + iU_i, \quad \begin{bmatrix} v_1\sigma(s_1) \\ v_2\sigma(s_2) \\ \vdots \\ v_m\sigma(s_m) \end{bmatrix} = u_r + iu_i.$$

Then, remove all zerc rows from $U_i$ and $u_i$ to obtain $U_t$ and $u_t$, respectively, and solve the nxn system $$\begin{bmatrix} U_r \\ U_t \end{bmatrix} x = \begin{bmatrix} u_r \\ u_t \end{bmatrix}$$

For the n-vector x with components $x_1, x_2, \ldots x_n$. Then, padding x with a zero entry to obtain the (n+1)-vector $$\begin{bmatrix} 0 \\ x \end{bmatrix},$$

the required b is obtained by removing the last component of the (n+1)-vector $$R^{-1}\begin{bmatrix} 0 \\ x \end{bmatrix},$$

where R is the triangular (n+1)×(n+1)-matrix $$R = \begin{bmatrix} & & & & 1 \\ & & & 1 & \sigma_1 \\ & & 1 & \sigma_1 & \sigma_2 \\ & \cdot^{\cdot^{\cdot}} & \cdot^{\cdot^{\cdot}} & \cdot^{\cdot^{\cdot}} & \vdots \\ 1 & \sigma_1 & \sigma_2 & \cdots & \sigma_n \end{bmatrix},$$

where empty matrix entries denote zeros.

Next, with prime (') denoting transposition, solve the Lyapunov equations $$P_oA+A'P_o=c'c$$

$$(A-P_o^{-1}c'c)P_c+P_c(A-P_o^{-1}c'c)'=bb'$$

which is a standard routine, form the matrix $$N=(I-P_oP_c)^{-1},$$

and compute the (n+1)-vectors $h^{(1)}$, $h^{(2)}$, $h^{(3)}$ and $h^{(4)}$ with components $h_0^{(1)}=1$, $h_k^{(1)}=cA^{k-1}P_o^{-1}Nc'$, k=1, 2, . . . , n $h_0^{(2)}=0$, $h^{k(2)}=cA^{k-1}N'b$, k=1, 2, . . . , n $h_0^{(3)}=0$, $h_k^{(3)}=-b'P_oA^{k-1}P_o^{-1}Nc'$, k=1, 2, . . . , n $h_0^{(4)}=1$, $h_k^{(4)}=-b'P_oA^{k-1}N'b$, k=1, 2, . . . , n.

Finally, compute the (n+1)-vectors $y^{(j)=TRh(j)}$, j=1, 2, 3, 4 with components $y_0^{(j)}, y_1^{(j)}, \ldots, y_n^{(j)}$, j=1, 2, 3, 4, where T is the (n+1)×(n+1) matrix, the k:th column of which is the vector of coefficients of the polynomial $$(s+1)^{n-k}(s-1)^k, \text{ for } k=0, 1, \ldots, n,$$

starting with the coefficient of $s^n$ and going down to the constant term, and R is the matrix defined above. Now form $$\hat{\alpha}_k = \frac{1}{\sqrt{1-\mu^2}}[\mu(y_k^{(3)}+y_k^{(1)})+(y_k^{(4)}+y_k^{(2)})], \quad k = 0, 1, \cdots, n,$$

$$\hat{\beta}_k = \frac{w_0}{\sqrt{1-\mu^2}}[\mu(y_k^{(3)}-y_k^{(1)})+(y_k^{(4)}-y_k^{(2)})], \quad k = 0, 1, \cdots, n,$$

where $$\mu = -\frac{y_0^{(2)}}{y_0^{(1)}}.$$

The (central) interpolant (3.7) is then given by $$f(z) = \frac{\hat{\beta}(z)}{\hat{\alpha}(z)},$$

where $\hat{\alpha}(z)$ and $\hat{\beta}(z)$ are the polynomials $$\hat{\alpha}(z)=\hat{\alpha}_0 z^n+\hat{\alpha}_1 z^{n-1}+\ldots+\hat{\alpha}_n,$$

$$\beta(z)=\hat{\beta}_0 z^n+\hat{\beta}_1 z^{n-1}+\ldots+\hat{\beta}_n.$$

However, to obtain the $\alpha(z)$ which matches the MA parameters $r=\tau$, $\hat{\alpha}(z)$ needs to be normalized by setting $$\alpha(z)=\frac{1+\tau_1^2+\ldots+\tau_n^2}{2(\hat{\alpha}_0\hat{\beta}_0+\hat{\alpha}_1\hat{\beta}_1+\hat{\alpha}_n\hat{\beta}_n)}\hat{\alpha}(z).$$

This is the output of the central solver.

Convex optimization algorithm for the tunable filter. To initiate the algorithm, one needs to choose an initial value for a, or, equivalently, for $\alpha(z)$, to be recursively updated. We disclose two methods of initialization, which can be used if no other guidelines, specific to the application, are available.

Initialization method 1. Given the solution of the Lyapunov equation $$S=A'SA+c'c, \tag{3.9}$$

where $$A=\begin{bmatrix}-\tau_1 & -\tau_2 & \cdots & -\tau_{n-1} & -\tau_n\\ 1 & 0 & \cdots & 0 & 0\\ 0 & 1 & \cdots & 0 & 0\\ \vdots & \vdots & \ddots & \vdots & \vdots\\ 0 & 0 & \cdots & 1 & 0\end{bmatrix}, \tag{3.10}$$

$$c=[0\ 0\ \cdots\ 0\ 1], \tag{3.11}$$

form $$\kappa=y'\begin{bmatrix}S & 0\\ 0 & 1\end{bmatrix}y,\quad y=L_n^{-1}r,$$

where r is the column vector having the coefficients 1, $r_1, \ldots, r_n$ of (3.2) as components and where $$L_n=\begin{bmatrix} & & & & 1\\ & & & 1 & \tau_1\\ & & 1 & \tau_1 & \tau_2\\ & \cdot^{\cdot^{\cdot}} & \cdot^{\cdot^{\cdot}} & \cdot^{\cdot^{\cdot}} & \vdots\\ 1 & \tau_1 & \tau_2 & \cdots & \tau_n\end{bmatrix}. \tag{3.12}$$

Then take $$\alpha(z)=\sqrt{\frac{\kappa}{2w_0}}\,\tau(z)$$

as initial value.

Initialization method 2. Take $$\alpha(z)=\left|\frac{1+r_1+\ldots+r_n}{1+\tau_1+\ldots+\tau_n}\right|\alpha_c(z),$$

where $\alpha_c(z)$ is the $\alpha$-polynomial obtained by first running the algorithm for the central solution described above.

Algorithm. Given the initial (3.4) and (3.1), solve the linear system of equations $$\left(\begin{bmatrix}1 & \ldots & \tau_{n-2} & \tau_{n-1} & \tau_n\\ \tau_1 & \ldots & \tau_{n-1} & \tau_n & \\ \tau_2 & \ldots & \tau_n & & \\ \vdots & \cdot^{\cdot^{\cdot}} & & & \\ \tau_n & & & & \end{bmatrix}+\begin{bmatrix}1 & \tau_1 & \tau_2 & \ldots & \tau_n\\ & 1 & \tau_1 & \ldots & \tau_{n-1}\\ & & 1 & \ldots & \tau_{n-2}\\ & & & \ddots & \vdots\\ & & & & 1\end{bmatrix}\right)\begin{bmatrix}s_0\\ s_1\\ s_2\\ \vdots\\ s_n\end{bmatrix}=\begin{bmatrix}a_0^2+a_1^2+a_2^2+\ldots+a_n^2\\ a_0a_1+a_1a_2+a_{n-1}a_n\\ a_0a_2+a_1a_3+a_{n-2}a_n\\ \vdots\\ a_0a_n\end{bmatrix}$$

for the column vector Swith components $s_0, s_1, \ldots, s_n$. Then, with the matrix $L_n$ given by (3.12), solve the linear system $L_n h=s$ for the vector $$h=\begin{bmatrix}h_n\\ h_{n-1}\\ \vdots\\ h_0\end{bmatrix} \tag{3.13}$$

The components of h are the Markov parameters defined via the expansion $$q(z)=\frac{\sigma(z)}{\tau(z)}=h_0+h_1z^{-1}+h_2z^{-2}+h_3z^{-3}+\ldots,$$

where $$\sigma(z):=s_0z^n+s_1z^{n-1}+\ldots+s_n. \tag{3.14}$$

The vector (3.13) is the quantity on which iterations are made in order to update $\alpha(z)$. More precisely, a convex function J(q), presented in C. I. Byrnes, T. T. Georgiou, and A. Lindquist, *A generalized entropy criterion for Nevanlina-Pick interpolation: A convex optimization approach to certain problems in systems and control*, preprint, and C. I. Byrnes, T. T. Georgiou, and A. Lindquist, *A new approach to spectral estimation: A tunable high-resolution spectral estimator*, preprint, is minimized recursively over the region where $$q(e^{i\theta})+q(e^{-i\theta})>0,\ \text{for } -\pi\leq\theta\leq\pi \tag{3.15}$$

This is done by upholding condition (3.6) while successively trying to satisfy the interpolation condition (3.8) by reducing the errors $$e_k=w_k-f(p_k^{-1}),\ k=0, 1, \ldots, n. \tag{3.16}$$

Each iteration of the algorithm consists of two steps. Before turning to these, some quantities, common to each iteration and thus computed off-line, need to be evaluated.

Given the MA parameter polynomial (3.2), let the real numbers $\pi_0, \pi_1, \ldots, \pi_n$ be defined via the expansion $$\rho(z)\rho(z^{31\ 1})=\pi_0+\pi_1(z+z^{-1})+\pi_2(z^2+z^{-2})+\ldots+\pi_n(z^n+z^{31\ n}). \tag{3.17}$$

Moreover, given a subset $p_1, p_2, \ldots p_m$ of the filter-bank poles $p_1, p_2, \ldots, p_n$ obtained by only including one $p_k$ in each complex conjugate pair $(p_k, \bar{p}_k)$, form the corresponding Vandermonde matrix $$V := \begin{bmatrix} p_1^{-(n-1)} & p_1^{-(n-2)} & \dots & p_1^{-1} & 1 \\ p_2^{-(n-1)} & p_2^{-(n-2)} & \dots & p_2^{-1} & 1 \\ \vdots & \vdots & \ddots & \vdots & \vdots \\ p_m^{-(n-1)} & p_m^{-(n-2)} & \dots & p_m^{-1} & 1 \end{bmatrix} = V_r + V_i, \quad (3.18)$$

together with its real part $V_r$ and imaginary part $V_i$ Moreover, given an arbitrary real polynomial $$\gamma(z)=g_0z^m+g_1z^{m-1}+ \dots +g_m, \quad (3.19)$$

define the (n+1)×(m+1) matrix $$M(\gamma) := \begin{bmatrix} g_0 & g_1 & \cdots & g_n & g_{n+1} & \cdots & g_m & & \\ & g_0 & g_1 & \cdots & g_n & g_{n+1} & \cdots & g_m & \\ & & \ddots & \ddots & & \ddots & \ddots & & \ddots \\ & & & g_0 & g_1 & \cdots & g_n & g_{n+1} & \cdots & g_m \end{bmatrix}. \quad (3.20)$$

We compute off-line $M(\rho)$, $M(\tau^*\rho)$ and $M(\tau\rho)$, where $\rho$ and $\tau$ are the polynomials (3.2) and (3.1) and $\tau^*(z)$ is the reversed polynomial $$\tau^*(z)=\tau_nz^n+\tau_{n-1}z^{n-1}+ \dots +\tau_1z+1.$$

Finally, we compute off-line Ln defined by (3.12), as well as the submatrix $L_{n-1}$.

Step 1. In this step the search direction of the optimization algorithm is determined. Given $\alpha(z)$, first find the unique polynomial (3.5) satisfying (3.6). Identifying coefficients of $z^k$, k=0, 1, . . . , n, this is seen to be a (regular) system of n+1 linear equations in the n+1 unknown $b_0, b_1, \dots, b_n$, bin namely $$\left( \begin{bmatrix} a_0 & \dots & a_{n-2} & a_{n-1} & a_n \\ a_1 & \dots & a_{n-1} & a_n & \\ a_2 & \dots & a_n & & \\ \vdots & ⋰ & & & \\ a_n & & & & \end{bmatrix} + \begin{bmatrix} a_0 & a_1 & a_2 & \dots & a_n \\ & a_0 & a_1 & \dots & a_{n-1} \\ & & a_0 & \dots & a_{n-2} \\ & & & \ddots & \vdots \\ & & & & a_0 \end{bmatrix} \right) \begin{bmatrix} b_0 \\ b_1 \\ b_2 \\ \vdots \\ b_n \end{bmatrix} = \begin{bmatrix} \pi_0 \\ \pi_1 \\ \pi_2 \\ \vdots \\ \pi_n \end{bmatrix}$$

where $\pi_0, \pi_1, \dots, \pi_n$ are given by (3.17). The coefficient matrix is a sum of a Hankel and a Toeplitz matrix and there are fast and efficient ways of solving such systems [G. Heinig, P. Jankowski and K. Rost, *Fast Inversion Algorithms of Toeplitz-plus-Hankel Matrices*, Numerische Mathematik 52 (1988), 665–682]. Next, form the function $$f(z) = \frac{\beta(z)}{\alpha(z)}.$$

This is a candidate for an approximation of the positive real part of the power spectrum $\Phi$ as in (2.8).

Next, we describe how to compute the gradient $\nabla J$. Evaluate the interpolation errors (3.16), noting that $e_0=w_0-b_0/a_0$, and decompose the complex vector $$\begin{bmatrix} (e_1 - e_0)\tau(p_1^{-1}) \\ (e_2 - e_0)\tau(p_2^{-1}) \\ \vdots \\ (e_n - e_0)\tau(p_n^{-1}) \end{bmatrix} = v_r + iv_i$$

into its real part $v_r$ and imaginary part $v_i$ Let $V_r$ and $V_i$ be defined by (3.18). Remove all zero rows from $V_i$ and $v_i$ to obtain $V_t$ and $v_t$. Solve the system $$\begin{bmatrix} V_r \\ V_t \end{bmatrix} x = \begin{bmatrix} v_r \\ v_t \end{bmatrix}$$

for the column vector x and form the gradient as $$\nabla J = 2\begin{bmatrix} SL_{n-1}^{-1}x \\ 2e_0 \end{bmatrix}, \quad (3.21)$$

where S is the solution to the Lyapunov equation (3.9) and $L_{n-1}$ is given by (3.12).

To obtain the search direction, using Newton's method, we need the Hessian. Next, we describe how it is computed. Let the 2n×2n-matrix $\hat{P}$ be the solution to the Lyapunov equation $$\hat{P}=\hat{A}'\hat{P}\hat{A}+\hat{c}'\hat{c},$$

where $\hat{A}$ is the companion matrix (formed analogously to A in (3.10)) of the polynomial $\alpha(z)^2$ and $\hat{c}$ is the 2n row vector (0, 0, . . . , 0, 1). Analogously, determine the 3n×3n-matrix $\tilde{P}$ solving the Lyapunov equation $$\tilde{P}=\tilde{A}'\tilde{P}\tilde{A}+\tilde{c}'\tilde{c},$$

where $\tilde{A}$ is the companion matrix (formed analogously to A in (3.10)) of the polynomial $\alpha(z)^2\tau(z)$ and $\tilde{c}$ is the 3n row vector (0, 0, . . . , 0, 1). Then, the Hessian is $$H=2H_1+H_2+H_2' \quad (3.22)$$

where $$H_1 = L_nM(\rho)L(\alpha^2)^{-1}\begin{bmatrix} \hat{P} & 0 \\ 0 & 1 \end{bmatrix}L(\alpha^2)^{-1}M(\rho)'L_n \quad (3.23)$$

$$H_2 = L_nM(\tau*\rho)L(\alpha^2\tau)^{-1}\begin{bmatrix} \tilde{P} & 0 \\ 0 & 1 \end{bmatrix}L(\alpha^2\tau)^{-1}M(\tau\rho)'\tilde{L}_n \quad (3.24)$$

where the precomputed matrices $L_n$ and $\tilde{L}_n$ are given by (3.12) and by reversing the order of the rows in (3.12), respectively. Also $M(\rho)$, $M(\tau^*\rho)$ and $M(\tau\rho)$ are computed off-line, as in (3.20), whereas $L(\alpha^2)^{-1}$ and $L(\alpha^2\tau)^{-1}$ are computed in the following way: For an arbitrary polynomial (3.19), determine $\lambda_0, \lambda_1, \dots, \lambda_m$ such that $$\gamma(z)(\lambda_0z^m+\lambda_1z^{m-1}+ \dots +\lambda_m)=z^{2m}+\pi(z),$$

where $\pi(z)$ is a polynomial of at most degree m 1. This yields m+1 linear equation for the m+1 unknowns $\lambda_0, \lambda_1, \dots, \lambda_m$, from which we obtain $$L(\gamma)^{-1} = \begin{bmatrix} \lambda_n & \cdots & \lambda_1 & \lambda_0 \\ \lambda_{n-1} & \cdots & \lambda_0 & \\ \vdots & ⋰ & & \\ \lambda_0 & & & \end{bmatrix}.$$

Finally, the new search direction becomes $$d=H^{-1}\nabla J. \quad (3.25)$$

Let $d_{previous}$ denote the search direction d obtained in the previous iteration. If this is the first iteration, initialize by setting $d_{previous}=0$.

Step 2. In this step a line search in the search direction d is performed. The basic elements are as follows. Five constants $c_j$, j=1, 2, 3, 4, 5, are specified with suggested default values $c_1=10^{-10}$, $c_2=1.5$, $c_3=1.5$, $c_4=0.5$, and $c_5=0.001$. If this is the first iteration, set $\lambda=c_5$.

If Hall $\|d\|<c_2\|d_{previous}\|$, increase the value of a parameter $\lambda$ by a factor $c_3$. Otherwise, retain the previous value of $\lambda$. Using this $\lambda$, determine $$h_{new}=h-\lambda d. \tag{3.26}$$

Then, an updated value for a is obtained by determining the polynomial (3.4) with all roots less than one in absolute value, satisfying $$\alpha(z)\alpha(z^{-1})=\sigma(z)\tau(z^{-1})+\sigma(z^{-1})\tau(z)$$

with $\sigma(z)$ being the updated polynomial (3.14) given by $$\sigma(z)=\tau(z)q(z),$$

where the updated q(z) is given by $$q(z)=c(zI-A)^{-1}g+h_0,$$

$$g=\begin{bmatrix} h_n \\ \vdots \\ h_1 \end{bmatrix},$$

with $h_n$, $h_{n-1}$, . . . , $h_0$ being the components of $h_{new}$, A and C given by (3.10). This is a standard polynomial factorization problem for which there are several algorithms [F. L. Bauer, *Ein direktes Iterationsverfahren zur Hurwitz-Zerlegung eines Polynoms*, Arch. Elek. Ubertragung, 9 (1955), 285–290; z. Vostry, *New algorithm for polynomial spectral factorization with quadratic convergence I*, Kybernetika 77 (1975), 411–418], using only ordinary arithmetic operations. Hence they can be implemented with an iMAC mathematics processing chip using ordinary skill in the art. However, the preferred method is described below (see explanation of routine q2a).

This factorization can be performed if and only if q(z) satisfies condition (3.15). If this condition fails, this is determined in the factorization procedure, and then the value of $\lambda$ is scaled down by a factor of $c_4$, and (3.26) is used to compute a new value for $h_{new}$ and then of q(z) successfully until condition (3.15) is met.

The algorithm is terminated when the approximation error given in (3.16) becomes less than a tolerance level specified by $c_1$, e.g., when $$\sum_{0}^{n}(e_k)^2 < c_1.$$

Otherwise, set h equal to $h_{new}$ and return to Step 1.

Description of technical steps in the procedure. The MATLAB code for this algorithm is given in Appendix B. As an alternative a state-space implementation presented in C. I. Byrnes, T. T. Georgiou, and A. Lindquist, *A generalized entropy criterion for Nevanlinna-Pick interpolation: A convex optimization approach to certain problems in systems and control*, preprint, and C. I. Byrnes, T. T. Georgiou, and A. Lindquist, *A new approach to spectral estimation: A tunable high-resolution spectral estimator*, preprint, may also be used. The steps are conveniently organized in four routines:

(1) Routine pm, which computes the Pick matrix from the given data $p=(p_0, p_1, \ldots, p_n)$ and $w=(w_0, w_1, \ldots, w_n)$.

(2) Routine q2a which is used to perform the technical step of factorization described in Step 2. More precisely, given q(z) we need to compute a rational function a(z) such that $$a(z)a(z^{-1})=q(z)+q(z^{-1})$$

for the minimum-phase solution a(z), in terms of which $\alpha(z)=\tau(z)a(z)$. This is standard and is done by solving the algebraic Riccati equation $$P-APA'-(g-APc')(2h_0-cPc')^{-1}(g-APc')'=0,$$

for the stabilizing solution. This yields $$a(z)=c(zI-A)^{-1}(g-APc')/\sqrt{2h_0-cPc'}+\sqrt{2h_0-cPc'}.$$

This is a standard MATLAB routine [W. F. Arnold, III and A. J. Laub, Generalized Eigenproblem Algorithms and Software for Albebraic Riccati Equations, Proc. IEEE, 72 (1984), 1746–1754].

(3) Routine central, which computes the central solution as described above.

(4) Routine decoder which integrates the above and provides the complete function for the decoder of the invention.

An application to speaker recognition. In automatic speaker recognition a person's identity is determined from a voice sample. This class of problems come in two types, namely speaker verification and speaker identification. In speaker verification, the person to be identified claims an identity, by for example presenting a personal smart card, and then speaks into an apparatus that will confirm or deny this claim. In speaker identification, on the other hand, the person makes no claim about his identity, and the system must decide the identity of the speaker, individually or as part of a group of enrolled people, or decide whether to classify the person as unknown.

Common for both applications is that each person to be identified must first enroll into the system. The enrollment (or training) is a procedure in which the person's voice is recorded and the characteristic features are extracted and stored. A feature set which is commonly used is the LPC coefficients for each frame of the speech signal, or some (nonlinear) transformation of these [Jayant M. Naik, Speaker Verification: A tutorial, IEEE Communications Magazine, January 1990, page 43], [Joseph P. Campbell Jr., Speaker Recognition: A tutorial, Proceedings of the HEEE 85 (1997), 1436–1462], [Sadaoki Furui, recent advances in Speaker Recognition, Lecture Notes in Computer Science 1206, 1997, page 239]. The motivation for using these is that the vocal tract can be modeled using a LPC filter and that these coefficients are related to the anatomy of the speaker and are thus speaker specific. The LPC model assumes a vocal tract excited at a closed end, which is the situation only for voiced speech. Hence it is common that the feature selection only processes the voiced segments of the speech [Joseph P. Campbell Jr., Speaker Recognition: A tutorial, Proceedings of the IEEE 85 (1997), page 1455]. Since the THREE filter is more general, other segments can also be processed, thereby extracting more information about the speaker.

Speaker recognition can further be divided into text-dependent and text-independent methods. The distinction between these is that for text-dependent methods the same text or code words are spoken for enrollment and for recognition, whereas for text-independent methods the words spoken are not specified.

Depending on whether a text-dependent or text-independent method is used, the pattern matching, the procedure of comparing the sequence of feature vectors with the corresponding one from the enrollment, is performed in different ways. The procedures for performing the pattern matching for text-dependent methods can be classified into template models and stochastic models. In a template model as the Dynamic Time Warping (DTW) [Hiroaki Sakoe and Seibi Chiba, Dynamic Programming Algorithm Optimization for Spoken Word Recognition, IEEE Transactions on Acoustics, Speech and Signal Processing ASSP-26 (1978), 43–49] one assigns to each frame of speech to be tested a corresponding frame from the enrollment. In a stochastic model as the Hidden Markov Model (HMM) [L. R. Rabiner and B. H. Juang, An Introduction to Hidden Markov Models, IEEE ASSP Magazine, January 1986, 4–16] a stochastic model is formed from the enrollment data, and the frames are paired in such a way as to maximize the probability that the feature sequence is generated by this model.

For text-independent speaker recognition the procedure can be used in a similar manner for speech-recognition-based methods and text-prompted recognition[Sadaoki Furui, Recent advances in Speaker Recognition, Lecture Notes in Computer Science 1206, 1997, page 241f] where the phonemes can be identified.

Figure 17:
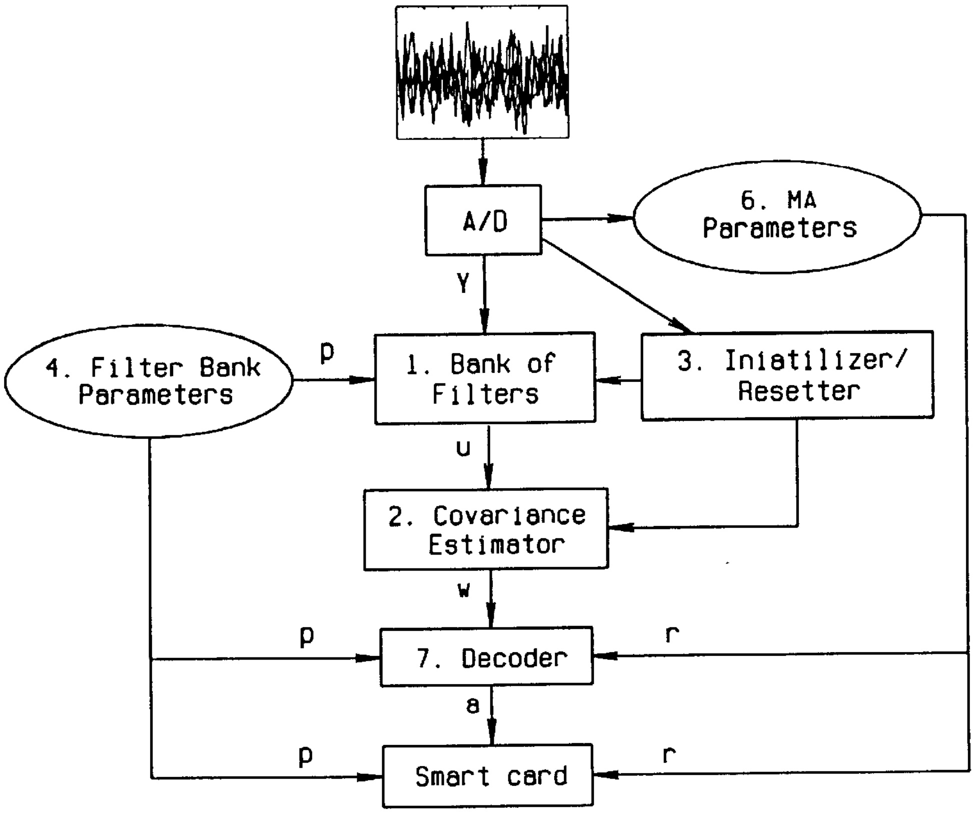
FIG. 17 is a block diagram depicting a speaker verification enrollment embodiment of the present invention.
Figure 18:
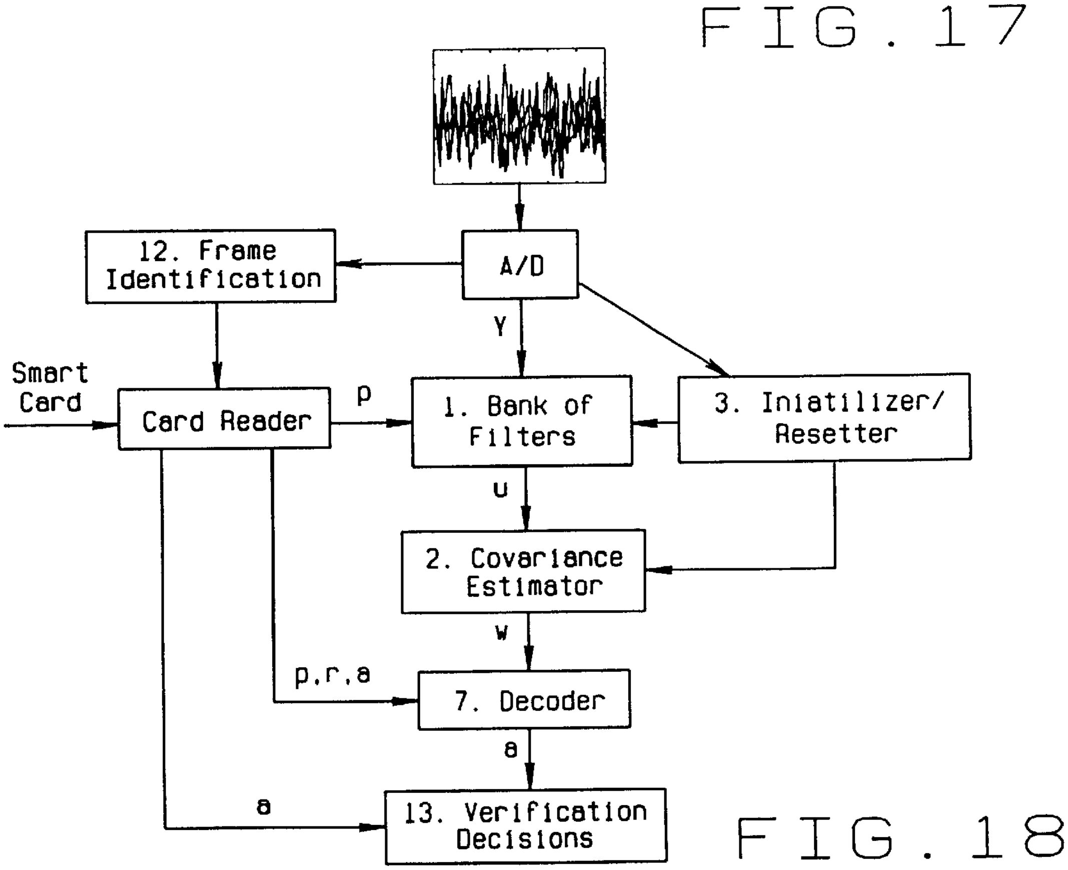
FIG. 18 is a block diagram depicting a speaker verification embodiment of the present invention.

Speaker verification. FIG. 17 depicts an apparatus for enrollment. An enrollment session in which certain code words are spoken by a person later to be identified produces via this apparatus a list of speech frames and their corresponding MA parameters r and AR parameters a, and these triplets are stored, for example, on a smart card, together with the filter-bank parameters p used to produce them. Hence, the information encoded on the smart card (or equivalent) is speaker specific. When the identity of the person in question needs to be verified, the person inserts his smart card in a card reader and speaks the code words into an apparatus as depicted in FIG. 18. Here, in Box 12, each frame of the speech is identified. This is done by any of the pattern matching methods mentioned above. These are standard procedures known in the literature [Joseph P. Campbell Jr., Speaker Recognition: A tutorial, Proceedings of the IEEE 85 (1997), pages 1452–1454]. From the smart card the corresponding r, a and p are retrieved. The filter-bank poles are transferred to the Bank of Filters and the Decoder. (Another p could be used, but the same has to be used in both Box 1 and Box 7.) The parameters r and a are also transferred to the Decoder. The AR parameters a are used as initial condition in the Decoder algorithm (unless the central solution is used in which case no initial condition is needed). Box 7 produces AR parameters a which hopefully are close to a. The error $\hat{a}-a$ from each frame is compounded in a measure of goodness-of-fit, and decision is finally made as to whether to accept or reject the person.

Figure 19:
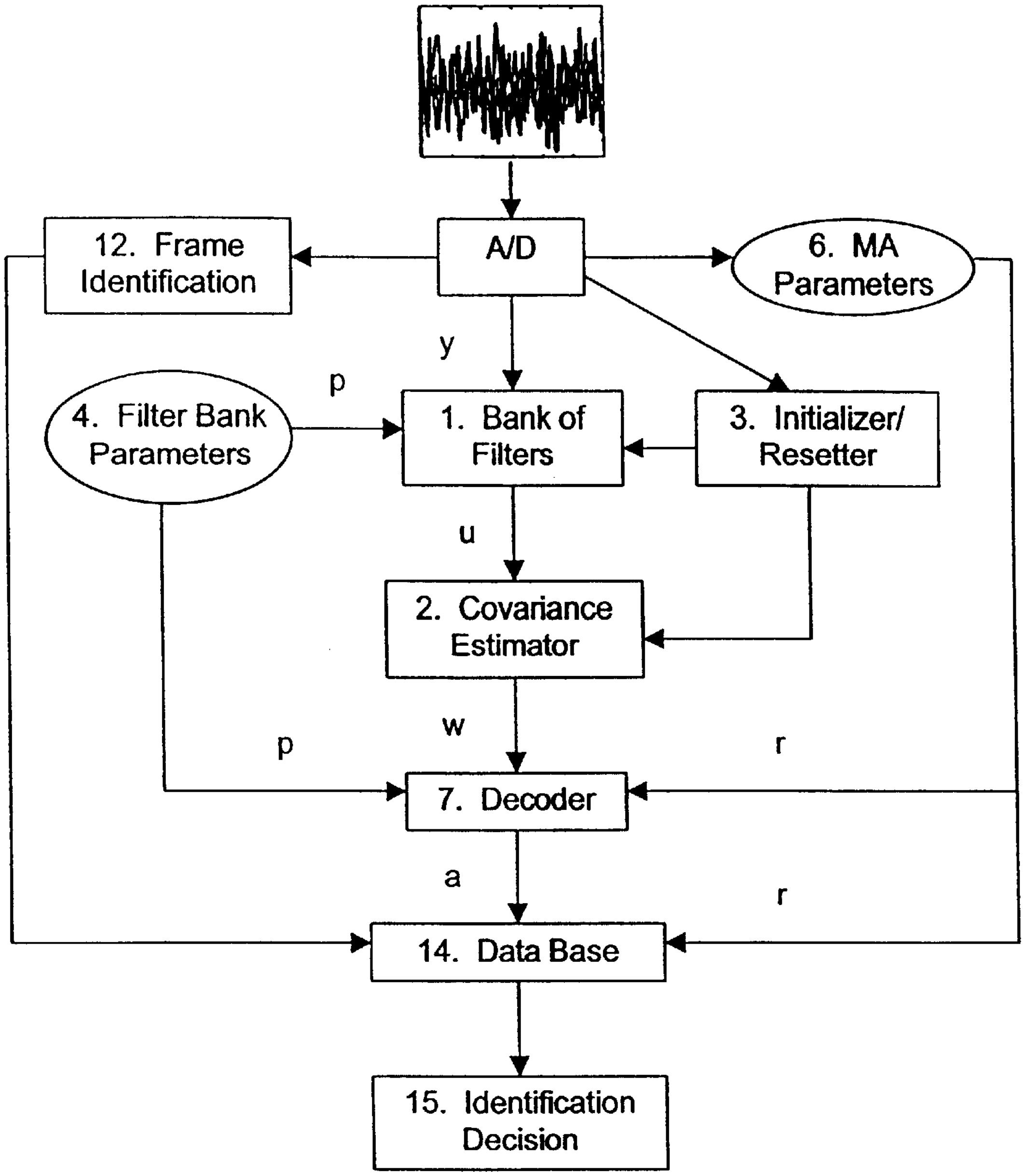
FIG. 19 is a block diagram of a speaker identification embodiment of the present invention.

Speaker identification. In speaker identification the enrollment is carried out in a similar fashion as for speaker verification except that the feature triplets are stored in a database. FIG. 19 depicts an apparatus for speaker identification. it works like that in FIG. 17 except that there is a frame identification box (Box 12) as in FIG. 18, the output of which together with the MA parameters a and AR parameters a are fed into a data base. The feature triplets are compared to the corresponding triplets for the population of the database and a matching score is given to each. On the basis of the (weighted) sum of the matching scores of each frame the identity of the speaker is decided.

Doppler-Based Applications and Measurement of Time-Delays. In communications, radar, sonar and geophysical seismology a signal to be estimated or reconstructed can often be described as a sum of harmonics in additive noise [P. Stoica and Ro. Moses, *Introduction to Spectral Analysis*, Prentice-Hall, 1997, page 139]. While traditional methods are designed for either white noise or no noise at all, estimation of sinusoids in colored noise has been regarded as difficult problem [B. Porat, *Digital Processing of Random Signals*, Prentice-Hall, 1994, pages 285–286]. THREE filter design is particularly suited for the colored noise case, and as an ARMA method it offers "super-resolution" capabilities [P. Stoica and Ro. Moses, *Introduction to Spectral Analysis*, Prentice-Hall, 1997, page 136]. As an illustration, see the second example in the introduction.

Tunable high-resolution smeed estimation by Doppler radar. We disclose an apparatus based on THREE filter design for determining the velocities of several moving objects. If we track m targets moving with constant radial velocities $v_1, v_2, \ldots, v_m$, respectively, by a pulse-Doppler radar emitting a signal of wave-length $\lambda$, the backscattered signal measured by the radar system after reflection of the objects takes the form $$y(t)=\sum_{k=1}^{m}\alpha_k e^{i\theta_k t}+v(t),$$

where $\theta_1, \theta_2, \ldots, \theta_m$ are the Doppler frequencies, v(t) is the measurement noise, and $\alpha_1, \alpha_2, \ldots, \alpha_m$ are (complex) amplitudes. (See, e.g., B. Porat, *Digital Processing of Random Signals*, Prentice-Hall, 1994, page 402] or [P. Stoica and Ro. Moses, *Introduction to Spectral Analysis*, Prentice-Hall, 1997, page 175].) The velocities can then be determined as $$v_k=\frac{\lambda\theta_k}{4\pi\Delta}\ k=1,2,\ldots,m,$$

where $\Delta$ is the pulse repetition interval, assuming once-per-pulse coherent in-phase/quadrature sampling.

Figure 20:
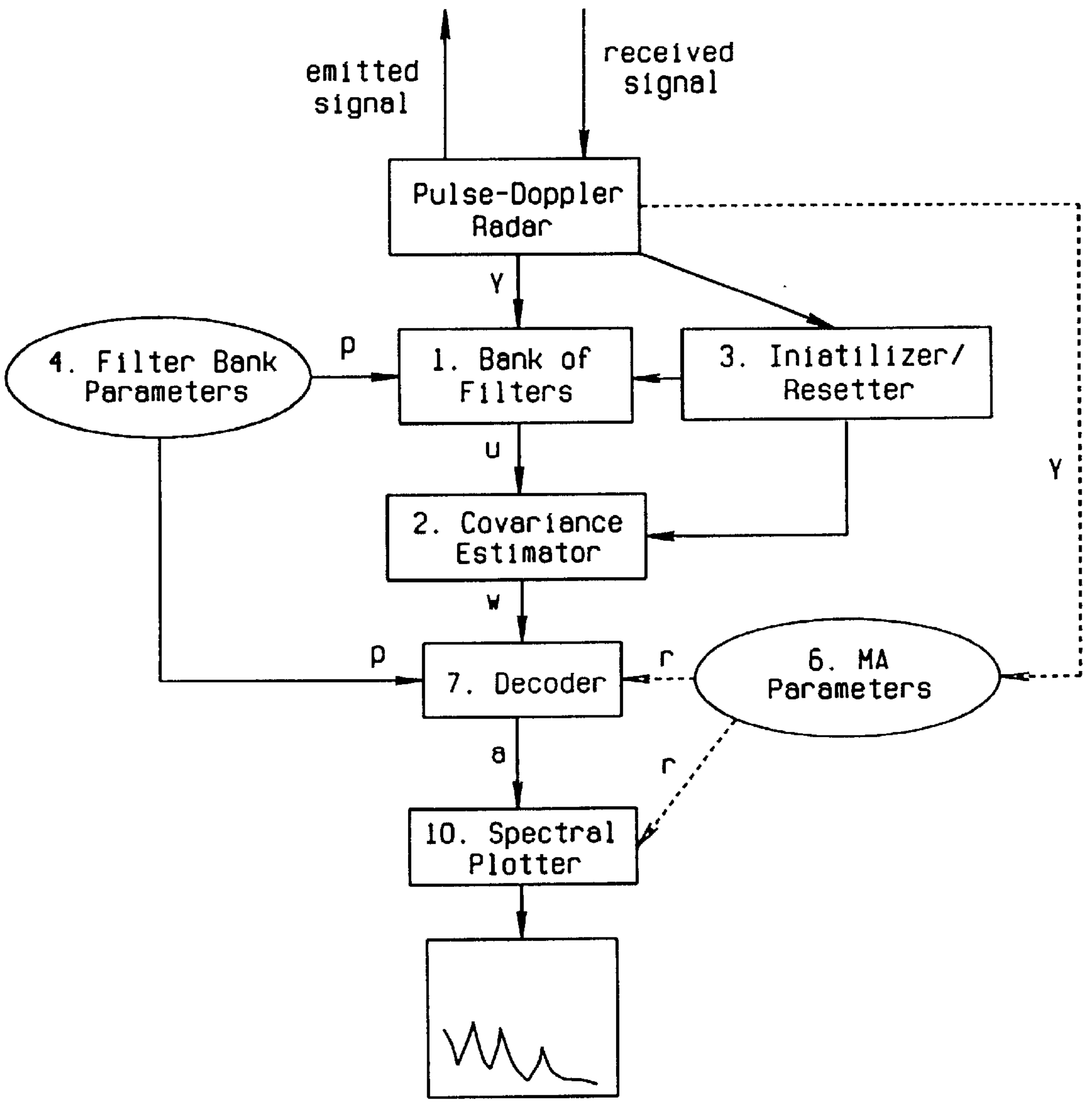
FIG. 20 is a block diagram of a doppler-based speed estimator embodiment of the present invention.

FIG. 20 illustrates a Doppler radar environment for our method, which is based on the Encoder and Spectral Analyzer components of the THREE filter. To estimate the velocities amounts to estimating the Doppler frequencies which appear as spikes in the estimated spectrum, as illustrated in FIG. 7. The device is tuned to give high resolution in the particular frequency band where the Doppler frequencies are expected.

The only variation in combining the previously disclosed Encoder and Spectral Estimator lies in the use of dashed rather than solid communication links in FIG. 20. The dashed communication links are optional. When no sequence r of MA parameters is transmitted from Box 6 to Box 7', Box 7' chooses the default values $r=(\tau_1, \tau_2, \ldots, \tau_n)$ which are defined via (3.1) in terms of the sequence p of filter-bank parameters, transmitted by Component 4 to Box 7'. In the default case, Box 7' also transmits the default values $r=\tau$ to Box 10. For those applications when it is desirable to tune the MA parameters sequence r from the observed data stream, as disclosed above, the dotted lines can be replaced by solid (open) communication links, which then transmit the tuned values of the MA parameter sequence r from Box 6 to Box 7' and Box 10.

The same device can also be used for certain spatial doppler-based applications [P. Stoica and Ro. Moses, *Introduction to Spectral Analysis*, Prentice-Hall, 1997, page 248].

Tunable high-resolution time-delay estimator. The use of THREE filter design in line spectra estimation also applies to time delay estimation [M. A. Hasan and M. R. Azimi-Sadjadi, Separation of multiple time delays using new spectral estimation schemes, IEEE Transactions on Signal Processing 46 (1998), 2618–2630] [M. Zeytinoǧlu and K. M. Wong, Detection of harmonic sets, IEEE Transactions on Signal Processing 43 (1995), 2618–2630] in communication. Indeed, the tunable resolution of THREE filters can be applied to sonar signal analysis, for example the identification of time-delays in underwater acoustics [M. A. Hasan and M. R. Azimi-Sadjadi, Separation of multiple time delays using new spectral estimation schemes, IEEE Transactions on Signal Processing 46 (1998), 2618–2630].

Figure 21:
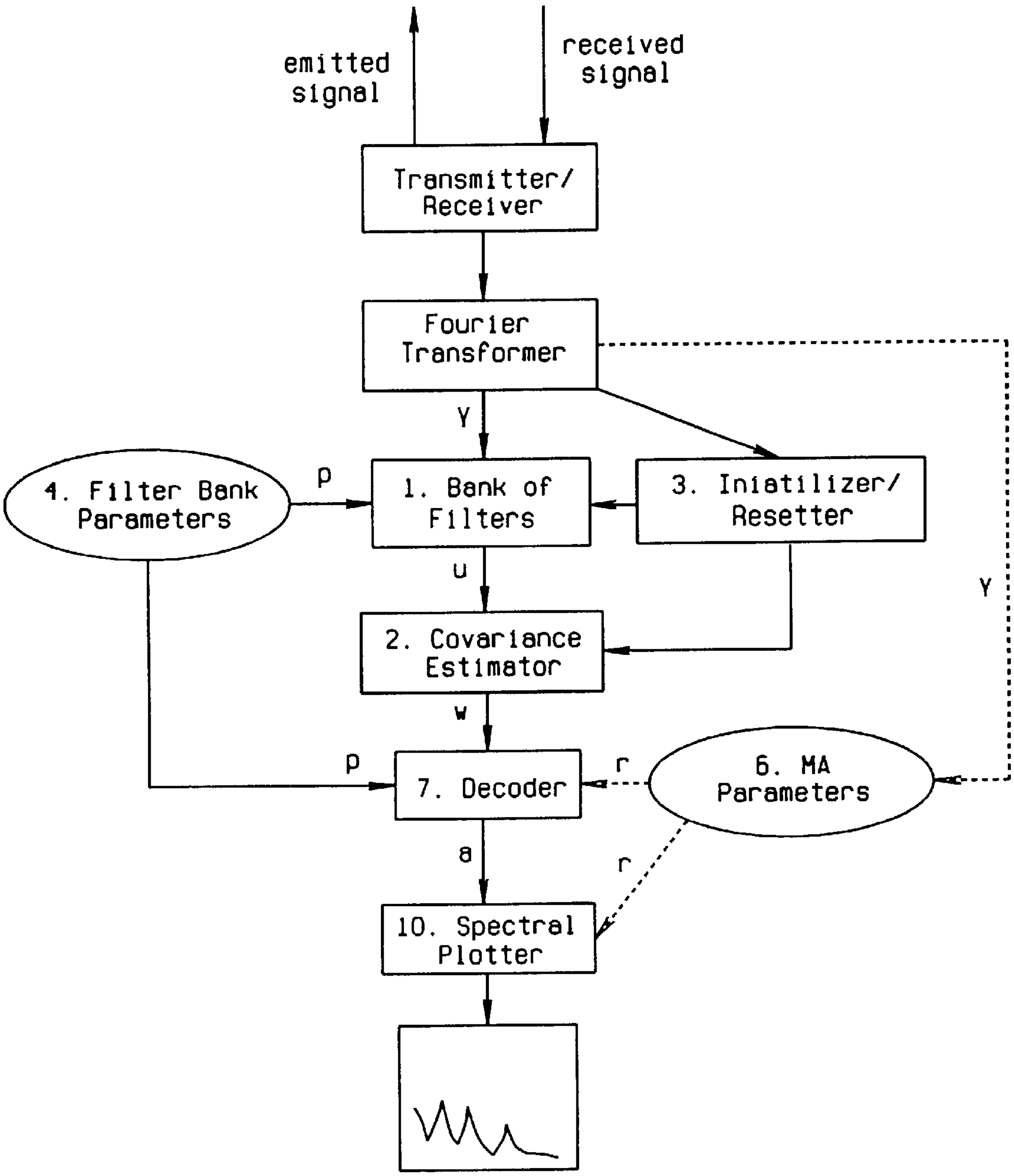
FIG. 21 is a block diagram for a time delay estimator embodiment of the present invention.

FIG. 21 illustrates a possible time-delay estimator environment for our method, which has precisely the same THREE-filter structure as in FIG. 20 except for the preprocessing of the signal. In fact, this adaptation of THREE filter design is a consequence of Fourier analysis, which gives a method of interchanging frequency and time. In more detail, if x(t) is the emitted signal, the backscattered signal is of the form $$z(t)=\sum_{k=1}^{m}h_k(t)*x(t-\delta_k)+v(t),$$

where the first term is a sum of convolutions of delayed copies of the emitted signal and v(t) represents ambient noise and measurement noise. The convolution kernels $h_k$, k=1, 2, . . . , m, represent effects of media or reverberation [(M. A. Hasan and M. R. Azimi-Sadjadi, Separation of multiple time delays using new spectral estimation schemes, IEEE Transactions on Signal Processing 46 (1998), 2618–26301], but they could also be δ-functions with Fourier transforms $H_k(\omega)=1$. More generally, we take $H_k(\omega)=\alpha_k H((\omega)$ for k=1, 2, . . . , m, where $H(\omega)$ is known and $\alpha_1$, . . . , $\alpha_m$ are unknown gain factors. Taking the Fourier transform, the signal becomes $$Z(\omega)=\sum_{k=1}^{m}H_k(\omega)X(\omega)e^{i\omega\delta_k}+n(\omega),$$

where the Fourier transform $X(\omega)$ of the original signal is known and can be divided off.

It is standard in the art to obtain a frequency-dependent signal from the time-dependent signal by fast Fourier methods, e.g., FFT. Sampling the signal $z(\omega)$ at frequencies $\omega=\tau\omega_0$, τ=0, 1, 2, . . . , N, and using our knowledge of the power spectrum $X(\omega)$ of the emitted signal, we obtain an observation record $y_0, y_1, y_2 \ldots, y_N$ of the real part of the time series $$y(\tau)=\sum_{k=1}^{m}\alpha_k e^{i\tau\theta_k}+v(\tau),$$

where $\theta_k=\omega_0\delta_k$ and $v(\tau)$ is the corresponding noise. To estimate spectral lines for this observation record is to estimate $\theta_k$, and hence the delay $\delta_k$ for k=1, 2, . . . , m. The method and apparatus described in FIG. 20 is then a THREE line-spectra estimator as the one disclosed above and described in FIG. 20 with the modifications described here. In particular, the Transmitter/Receiver could be a sonar.

Other Areas of Application. The THREE filter method and apparatus can be used in the encoding and decoding of signals more broadly in applications of digital signal processing. In addition to speaker identification and verification, THREE filter design could be used as a part of any system for speech compression and speech processing. The use of THREE filter design line spectra estimation also applies to detection of harmonic sets [M. Zeytinoǧlu and K. M. Wong, Detection of harmonic sets, IEEE Transactions on Signal Processing 43 (1995), 2618–2630]. Other areas of potential importance include identification of formants in speech and data decimation[M. A. Hasan and M. R. Azimi-Sadjadi, Separation of multiple time delays using new spectral estimation schemes, IEEE Transactions on Signal Processing 46 (1998), 2618–2630]. Finally, we disclose that the fixed-mode THREE filter, where the values of the MA parameters are set at the default values determined by the filter-bank poles also possesses a security feature because of its fixed-mode feature: If both the sender and receiver share a prearranged set of filter-bank parameters, then to encode, transmit and decode a signal one need only encode and transmit the parameters w generated by the bank of filters. Even in a public domain broadcast, one would need knowledge of the filter-bank poles to recover the transmitted signal.

Various changes may be made to the invention as would be apparent to those skilled in the art. However, the invention is limited only to the scope of the claims appended hereto, and their equivalents.

What is claimed is:

1. A Doppler-based speed estimator comprising:

a pulse-Doppler radar configured to (1) sense an object, and (2) produce an observation record representative of a backscattered signal from said sensed object;

a filter bank comprising a plurality of first order filters in parallel or a plurality of second order filters in parallel, said filters being tuned with a set of filter bank poles to desired frequencies, each of said filters being configured to (1) receive said observation record, and (2) filter said observation read in accordance with a filter function defined by at least one of said filter bank poles;

a covariance estimator configured to (1) receive said filtered observation records from each of said filters, and (2) determine-a set of filter covariances therefrom, a decoder configured to (1) receive said filter covariances, (2) receive said filter bank poles, and (3) determine a set of autoregressive parameters from said filter covariances and said filter bank poles, said autoregressive parameters at least partially defining the coefficients of a denominator polynomial for a transfer function from which the power frequency spectrum of said observation record is determinable; and a spectral plotter configured to (1) receive said filter parameters, (2) receive data corresponding to the coefficients of a numerator polynomial for said transfer function, and (3) determine the power frequency spectrum of said observation record from said filter paters and said numerator data, the speed of said sensed object being idefiable therefrom.

2. The speed estimator of claim 1 wherein said tansfer function includes a plurality of poles and a plurality of zeros.

3. The speed estimator of claim 2 wherein said numerator data is said filter bank poles.

4. The speed estimator of claim 3 wherein said decoder is further configured to execute a central solution algorithm in determining said autoregressive parameters.

5. The speed estimator of claim 2 further comprising a moving average parameter selector configured to (1) receive said observation record, (2) determine a set of moving average parameters therefrom, said moving average parameters being said numerator data received by said spectral plotter.

6. The speed estimator of claim 5 wherein said decoder is further configured to (1) receive said moving average parameters, (2) determine said set of autoregressive parameters from said filter covariances, said filter bank poles, and said moving average parameters.

7. The speed estimator of claim 6 wherein said decoder is further configured to execute a convex optimization algorithm in determining said autoregressive parameters.

8. The speed estimator of claim 7 wherein said filters comprising said filter bank are adjustable to permit their being tuned to a desired frequency based on a priori information.

9. The speed estimator of claim 8 wherein the number of filters corrsing said filter bank is adjustable.

10. The speed estimator of claim 1 wherein said filters comprising said filter bank are first order filers.

11. The speed estimator of claim 1 wherein said filters comprising said filter bank are second order filters.

12. A method for estimating a speed of an object with a Doppler-based radar, said method comprising:

sensing an object with a pulse-Doppler radar to thereby produce an observation record representative of a back-scattered signal from said sensed object;

filtering said observation record through a plurality of filters in parallel, said plurality of parallel filters being either a plurality of first order filters or a plurality of second order filters, each of said filters having a filter function defined by at least one filter bank pole of a set of filter bank poles;

estimating a set of filter covariances from each filter observation record;

determining a set of autoregressive parameters at least partially in response to said filter covariances and said filter bank poles, said autoregressive parameters at least partially defining the coefficients of a denominator polynomial for a transfer function from which the power frequency spectrum of said observation record is determinable;

determining a set of moving average parameters representative of the coefficients of a numerator polynomial for said transfer function;

determining the power frequency spectrum of said observation record at least partially in response to said autoregressive parameters and said moving average parameters; and determining the speed of said sensed object from said power frequency spectrum.

13. The method of claim 12 wherein said moving average parameter determining step includes determining said set of moving average parameters such that said transfer function includes a plurality of zeros.

14. The method of claim 13 wherein said moving average parameter determining step includes determining said set of moving average parameters from said filter bank poles.

15. The method of claim 14 wherein said autoregressive parameter determining step includes executing a central solution algorithm to thereby determine said autoregressive parameters.

16. The method of claim 13 wherein said moving average parameter determining step includes determining said set of moving average parameters from said observation record.

17. The method of claim 16 wherein said autoregressive parameter determining step includes determining said set of autoregressive parameters from said filter covariances, said filter bank poles, and said moving average parameters.

18. The method of claim 17 wherein said autoregressive parameter determining step includes executing a convex optimization algorithm to thereby determine said autoregressive parameters.

19. The method of claim 18 further comprising selecting said filter bank poles at least partially in response to a priori information to thereby tune each of said filters to a desired frequency.

20. The method of claim 19 further comprising adjusting the number of said filters.

21. The method of claim 12 wherein said filtering step includes filtering said observation record through a plurality of filters in parallel, said plurality of parallel filters being first order filters.

22. The method of claim 12 wherein said filtering step includes filtering said observation record through a plurality of filters in parallel, said plurality of parallel filters being second order filters.

23. A device for estimating the delay between any two signals, said device comprising:

a sensing device configured to produce a time-based output reflective of any delay desired to be estimated;

a Fourier transformer configured to (1) receive said time-based output, and (2) convert said time-based output to an observation record representative of a frequency-based output;

a filter bank comprising a plurality of first order filters in parallel or a plurality of second order filters in parallel, said filters being tuned with a set of filter bank poles to desired frequencies, each of said filters being configured to (1) receive said observation record, and (2) filter said observation record in accordance with a filter function defied by at least one of said filter bank poles;

a covariance estimator configured to (1) receive said filtered observation records from each of said filters, and (2) determine a set of filter covariances therefrom;

a decoder configured to (1) receive said filter covariances, (2) receive said filter bank poles, and (3) determine a set of autoregressive parameters from said filter covariances and said filter bank poles, said autoregressive parameters at least partially defining the coefficients of a denominator polynomial for a transfer function from which the power frequency spectrum of said observation record is determinable; and a spectral plotter configured to (1) receive said filter parameters, (2) receive data corresponding to the coefficients of a numerator polynomial for said transfer function, and (3) determine the power frequency spectrum of said observation record from said filter parameters and said numerator data, the desired delay being identifiable therefrom.

24. The device of claim 23 wherein said transfer function includes a plurality of poles and a plurality of zeros.

25. The device of claim 24 wherein said numerator data is said filter bank poles.

26. The device of claim 25 wherein said decoder is further configured to execute a central solution algorithm in determining said autoregressive parameters.

27. The device of claim 24 further comprising a moving average parameter selector configured to (1) receive said observation record, (2) determine a set of moving average parameters therefrom, said moving average parameters being said numerator data received by said spectral plotter.

28. The device of claim 26 wherein said decoder is further configured to (1) receive said moving average parameters, (2) determine said set of autoregressive parameters from said filter covariances, said filter bank poles, and said moving average parameters.

29. The device of claim 28 wherein said decoder is further configured to execute a convex optimization algorithm in determining said autoregressive parameters.

30. The device of claim 29 wherein said filters comprising said filter bank are adjustable to permit their being tuned to a desired frequency based on a priori information.

31. The device of claim 30 wherein the number of filters comprising said filter bank is adjustable.

32. The device of claim 23 wherein said filters comprising said filter bank are fist order filters.

33. The device of claim wherein said filters comprising said filter bank are second order filters.

34. A method for estimating the delay between any two signals, said method comprising:

producing a time-based output reflective of any delay desired to be estimated;

converting said time-based output to a frequency-based output using a Fourier transform;

producing an observation record from said frequency-based output;

filtering said observation record through a plurality of filters in parallel, said plurality of parallel filters being either a plurality of first order filters or a plurality of second order filters, each of said filters having a filter function defined by at least one filter bank pole of a set of filter bank poles;

estimating a set of filter covariances from each filtered observation record;

determining a set of autoregressive parameters at least partially in response to said filter covariances and said filter bank poles, said autoregressive parameters at least partially defining the coefficients of a denominator polynomial for a transfer function from which the power frequency spectrum of said observation record is determinable;

determining a set of moving average parameters representative of the coefficients of a numerator polynomial for said transfer function;

determining the power frequency spectrum of said observation record at least partially in response to said autoregressive parameters and said moving average parameters; and determining the desired delay from said power frequency spectrum.

35. The method of claim 34 wherein said moving average parameter determining step includes determining said set of moving average parameters such that said transfer function includes a plurality of zeros.

36. The method of claim 35 wherein said moving average parameter determining step includes determining said set of moving average parameters from said filter bank poles.

37. The method of claim 36 wherein said autoregressive parameter determining step includes executing a central solution algorithm to thereby determine said autoregressive parameters.

38. The method of claim 35 wherein said moving average parameter determining step includes determining said set of moving average parameters from said observation record.

39. The method of claim 38 wherein said autoregressive parameter determining step includes determining said set of autoregressive parameters from said filter covarances, said filter bank poles, and said moving average parameters.

40. The method of claim 39 wherein said autoregressive parameter determining step includes executing a convex optimization algorithm to thereby determine said autoregressive parameters.

41. The method of claim 40 further comprising selecting said filter bank poles at least partially in response to a priori information to thereby time each of said filters to a desired frequency.

42. The method of claim 41 further comprising adjusting the number of said filters.

43. The method of claim 34 wherein said filtering step includes filtering said observation record through a plurality of filters in parallel, said plurality of parallel filters being first order filters.

44. The method of claim 34 wherein said filtering step includes filtering said observation record through a plurality of filters in parallel, said plurality of parallel filters being second order filters.

* * * * *

UNITED STATES PATENT AND TRADEMARK OFFICE

CERTIFICATE OF CORRECTION

PATENT NO. : 6,400,310 B1
DATED : June 4, 2002
INVENTOR(S) : Christopher I. Byrnes, Anders Lindquist and Tryphon T. Georgiou It is certified that error appears in the above-identified patent and that said Letters Patent is hereby corrected as shown below:

Column 1,
Line 4, -- This invention was made with government support under ECS -9505995 awarded by the National Science Foundation and F49620-96-1-0094 awarded by the U.S. Air Force. The government has certain rights in the invention --

Signed and Sealed this

Fifteenth Day of March, 2005

JON W. DUDAS
*Director of the United States Patent and Trademark Office*

UNITED STATES PATENT AND TRADEMARK OFFICE

CERTIFICATE OF CORRECTION

PATENT NO. : 6,400,310 B1 
APPLICATION NO. : 09/176984
DATED : June 4, 2002
INVENTOR(S) : Christopher I. Byrnes, Anders Lindquist and Tryphon T. Georgiou It is certified that error appears in the above-identified patent and that said Letters Patent is hereby corrected as shown below:

Title page:

Replace: "(73) Assignee: Washington University, St. Louis, MO (US)"
With: -- (73) Assignees: Washington University, St. Louis, MO (US); Regents of the University of Minnesota --

Signed and Sealed this

Seventeenth Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 6,400,310 B1
APPLICATION NO. : 09/176984
DATED : June 4, 2002
INVENTOR(S) : Byrnes et al.

It is certified that error appears in the above-identified patent and that said Letters Patent is hereby corrected as shown below:

Column 1, line 5, after the TITLE and before the "BACKGROUND OF THE INVENTION" section should appear as follows:

--STATEMENT REGARDING FEDERALLY SPONSORED RESEARCH OR DEVELOPMENT:

This invention was made with government support under ECS-9505995 awarded by the National Science Foundation and F49620-96-1-0094 awarded by the Department of the Air Force. The government has certain rights in the invention.--

Signed and Sealed this
Eighth Day of November, 2011

David J. Kappos
*Director of the United States Patent and Trademark Office*